(12) United States Patent
Aute et al.

(10) Patent No.: US 12,449,205 B2
(45) Date of Patent: Oct. 21, 2025

(54) CROSS-FLOW HEAT EXCHANGER SYSTEMS AND METHODS FOR FABRICATION THEREOF

(71) Applicants: University of Maryland, College Park, College Park, MD (US); Heat Transfer Technologies, LLC, Prospect Heights, IL (US)

(72) Inventors: Vikrant C. Aute, Jessup, MD (US); Daniel Fernandes Bacellar, Silver Spring, MD (US); K. Reinhard Radermacher, Silver Spring, MD (US); James M. Tancabel, College Park, MD (US); Jiazhen Ling, Ellicott City, MD (US); Yoram Leon Shabtay, Prospect Heights, IL (US); Jan Muehlbauer, Fulton, MD (US)

(73) Assignees: University of Maryland, College Park, College Park, MD (US); Heat Transfer Technologies, LLC, Prospect Heights, IL (US)

( * ) Notice: Subject to any disclaimer, the term of this patent is extended or adjusted under 35 U.S.C. 154(b) by 826 days.

(21) Appl. No.: 17/196,894

(22) Filed: Mar. 9, 2021

(65) Prior Publication Data
US 2021/0285727 A1 Sep. 16, 2021

Related U.S. Application Data

(60) Provisional application No. 62/987,741, filed on Mar. 10, 2020.

(51) Int. Cl.
*F28D 7/16* (2006.01)
*B23P 15/26* (2006.01)
*F28F 9/02* (2006.01)

(52) U.S. Cl.
CPC .............. *F28D 7/16* (2013.01); *B23P 15/26* (2013.01); *F28F 9/02* (2013.01)

(58) Field of Classification Search
CPC .......... F28D 7/16; F28D 7/00; F28D 1/05375; F28D 2021/0068; F28F 17/005;
(Continued)

(56) References Cited

U.S. PATENT DOCUMENTS

| 3,969,448 A | * | 7/1976 | Limebeer | ............... F28F 13/06 62/305 |
| 4,373,580 A | * | 2/1983 | Gossalter | .................. F28F 9/14 165/173 |

(Continued)

FOREIGN PATENT DOCUMENTS

| EP | 3009780 A1 | * | 4/2016 | ............... F28D 7/16 |
| GB | 2234807 A | * | 2/1991 | ............ F28F 9/0229 |
| JP | H04177091 A | * | 6/1994 | |

OTHER PUBLICATIONS

Abdelaziz et al., "Approximation-Assisted Optimization for Novel Compact Heat Exchanger Designs," *HVAC&R Research*, 2010, 16(5): pp. 707-728. (23 pages).
(Continued)

*Primary Examiner* — Harry E Arant
(74) *Attorney, Agent, or Firm* — Rowan Tree Law Group, PLLC; Frederick F. Rosenberger

(57) ABSTRACT

A heat exchanger has first and second manifold portions and an array of substantially-parallel heat-transfer tubes extending between the first and second manifold portions. Each heat-transfer tube has an outer surface and an inner surface defining a conduit. In a cross-sectional view, the outer surface of each heat-transfer tube can form a first shape that is non-circular, and the inner surface of heat-transfer tube can form a second shape different than the first shape. Alternatively or additionally, at least one of the first shape
(Continued)

and the second shape lacks reflectional symmetry in the cross-sectional view. Methods for fabricating such heat exchangers are also provided.

17 Claims, 17 Drawing Sheets

(58) Field of Classification Search
CPC .... F28F 9/02; F28F 9/0219; F28F 1/32; F28F 9/0209; F28F 1/022; F28F 9/16; F28F 1/02; F28F 9/0229; F28F 2210/08; F28F 2255/14

See application file for complete search history.

(56) References Cited

U.S. PATENT DOCUMENTS

| | | | | |
|---|---|---|---|---|
| 5,226,235 | A * | 7/1993 | Lesage | F28F 9/001 29/890.047 |
| 6,302,197 | B1 * | 10/2001 | Hornby | F28F 1/02 165/173 |
| 2005/0241813 | A1 * | 11/2005 | Choi | F28D 1/0477 165/151 |
| 2005/0257921 | A1 * | 11/2005 | Hu | F28D 1/0443 165/140 |
| 2009/0084129 | A1 * | 4/2009 | Kim | F28F 13/08 62/502 |
| 2009/0294113 | A1 | 12/2009 | Cha et al. | |
| 2010/0263847 | A1 * | 10/2010 | Alahyari | F28D 1/05333 165/173 |
| 2014/0262171 | A1 | 9/2014 | Ljubicic | |
| 2014/0262172 | A1 | 9/2014 | Ljubicic | |
| 2016/0195345 | A1 * | 7/2016 | Schult | F28D 1/05366 62/286 |
| 2019/0263967 | A1 * | 8/2019 | Sutton | B01D 5/0012 |
| 2020/0096206 | A1 * | 3/2020 | Kim | F28F 1/14 |

OTHER PUBLICATIONS

Bacellar, Daniel Fernandes, "Airside passive heat transfer enhancement, using multi-scale analysis and shape optimization, for compact heat exchangers with small characteristic lengths," Doctoral Dissertation [online], University of Maryland, College Park, 2016 [retrieved on Jan. 8, 2024]. Retrieved from the Internet: <URL: https://drum.lib.umd.edu/items/86f24153-eb0f-4ae7-9d4e-098d2c363222>. (299 pages).

Fabbri, G., "A genetic algorithm for fin profile optimization," *International Journal of Heat and Mass Transfer*, 1997, 40(9): pp. 2165-2172. (8 pages).

Foli et al., "Optimization of micro heat exchanger: CFD, analytical approach and multi-objective evolutionary algorithms," *International Journal of Heat and Mass Transfer*, 2006, 49: pp. 1090-1099. (10 pages).

Gosselin et al., "Review of utilization of genetic algorithms in heat transfer problems," *International Journal of Heat and Mass Transfer*, 2009, 52: pp. 2169-2188. (20 pages).

Hilbert et al., "Multi-objective shape optimization of a heat exchanger using parallel genetic algorithms," *International Journal of Heat and Mass Transfer*, 2006, 49: pp. 2567-2577. (11 pages).

Huang et al., "A Survey of Optimization Formulations and Techniques for the Design of Heat Exchangers Using Lower GWP Refrigerants," *ASHRAE Winter Conference Proceedings*, 2015, CH-15-C039. (8 pages).

Jiang et al., "CoilDesigner: A general-purpose simulation and design tool for air-to-refrigerant heat exchangers," *International Journal of Refrigeration*, 2006, 29: pp. 601-610. (10 pages).

Mehendale et al., "Fluid flow and heat transfer at micro- and meso-scales with application to heat exchanger design," *Appl. Mech. Rev.*, Jul. 2000, 53(7): pp. 175-193. (19 pages).

Min et al., "Numerical Analyses of Effects of Tube Shape on Performance of a Finned Tube Heat Exchanger," *Journal of Enhanced Heat Transfer*, 2004, 11(1): pp. 61-73. (13 pages).

Nobile et al., "Geometric Parameterization and Multiobjective Shape Optimization of Convective Periodic Channels," *Numerical Heat Transfer, Part B: Fundamentals*, 2006, 50(5): pp. 425-453. (30 pages).

Queipo et al., "Genetic algorithms for thermosciences research: application to the optimized cooling of electronic components," *International Journal of Heat and Mass Transfer*, 1994, 37(6): pp. 893-908. (16 pages).

Ranut et al., "Multi-objective shape optimization of a tube bundle in cross-flow," *International Journal of Heat and Mass Transfer*, 2014, 68: pp. 585-598. (14 pages).

Singh et al., "A heat exchanger model for air-to-refrigerant fin-and-tube heat exchanger with arbitrary fin sheet," *International Journal of Refrigeration*, 2009, 32: pp. 1724-1735. (12 pages).

Table of Contents from: Cressie, N., *Statistics for Spatial Data* (New York, John Wiley & Sons, Inc., 1993). (8 pages).

Table of Contents from: Piegl et al., *The NURBS Book—Monographs in Visual Communication* (New York, Springer, 1995). (13 pages).

Wang et al., "An investigation of the airside performance of the slit fin-and-tube heat exchangers," *International Journal of Refrigeration*, 1999, 22: pp. 595-603. (9 pages).

Winkler et al., "Comprehensive investigation of numerical methods in simulating a steady-state vapor compression system," *International Journal of Refrigeration*, 2008, 31(5): pp. 930-942. (13 pages).

* cited by examiner

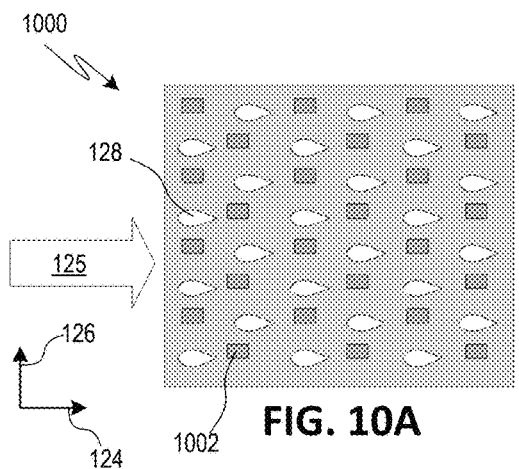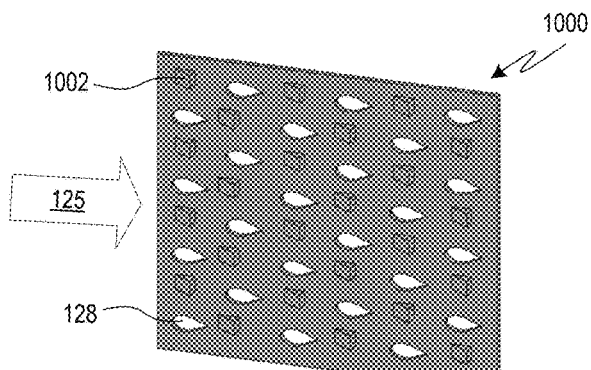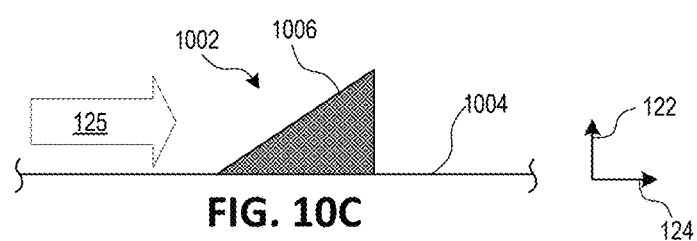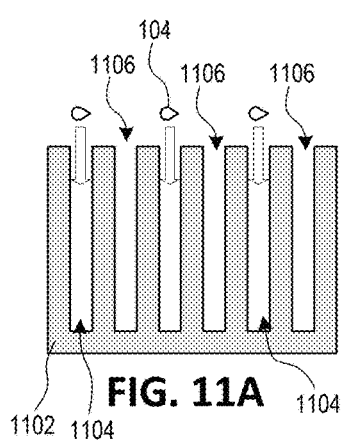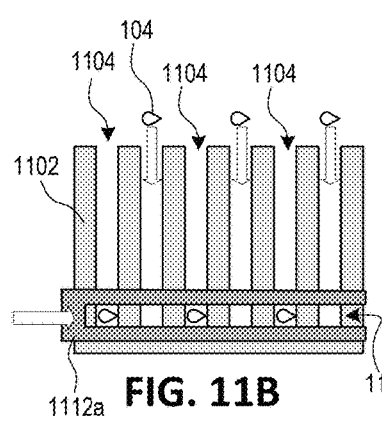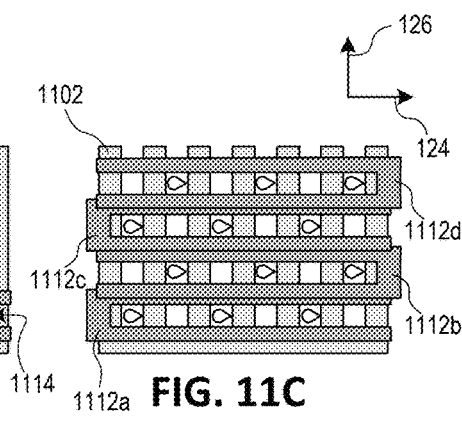

CROSS-FLOW HEAT EXCHANGER SYSTEMS AND METHODS FOR FABRICATION THEREOF

CROSS-REFERENCE TO RELATED APPLICATION

The present application claims the benefit of U.S. Provisional Application No. 62/987,741, filed Mar. 10, 2020, entitled "Fluid and Structural Design Framework for Gas-to-Fluid Heat Exchanger and Methods of Manufacturing the Same," which is incorporated by reference herein in its entirety.

STATEMENT REGARDING FEDERALLY SPONSORED RESEARCH

This invention was made with government support under DE-EE0008221 awarded by the U.S. Department of Energy. The government has certain rights in the invention.

FIELD

The present disclosure relates generally to heat exchange, and more particularly, to the design and fabrication of cross-flow heat exchangers having an array of parallel heat-transfer tubes.

SUMMARY

Embodiments of the disclosed subject matter provide heat exchangers having an array of substantially-parallel heat-transfer tubes. Each heat-transfer tube in the array can have an outer heat-transfer surface that forms a non-circular shape in cross-sectional view. In contrast to conventional round or flat tubes that may suffer from performance limitations, the disclosed heat-exchangers can better balance hydraulic resistance and heat-transfer characteristics, thereby leading to improved performance. In some embodiments, an internal conduit of each heat-transfer tube can have a cross-sectional shape that is different from the outer heat-transfer surface, for example, to improve structural integrity and/or manufacturability of the tubes. In some embodiments, the outer heat-transfer surface, the internal conduit, or both have shapes in cross-sectional view that are asymmetrical. The disclosed heat exchangers can be used in any application where air, gas, refrigerant, or other fluids are heated or cooled, such as commercial or residential heating, ventilation, and air-conditioning, and refrigeration (HVAC&R) systems.

Embodiments of the disclosed subject matter also provide methods for fabricating such heat exchangers. In some embodiments, ends of an array of heat-transfer tubes are simultaneously coupled to corresponding portions of one or more manifolds in order to form the heat exchanger. Alternatively, in some embodiments, manifolds or portions of a single manifold are formed in place around corresponding ends of an array of heat-transfer tubes to form the heat exchanger. Alternatively, in some embodiments, ends of an array of heat-transfer tubes are embedded within or integrally formed with a header, and the header can be subsequently coupled to a mating member to form a manifold of the heat exchanger.

In a representative embodiment, a heat exchanger comprises first and second manifold portions, an array of substantially-parallel first heat-transfer tubes between the first and second manifold portions, and one or more spacers. Each first heat-transfer tube can extend along a first direction. A first end of each first heat-transfer tube can be in fluid communication with the first manifold portion, and a second end of each first heat-transfer tube can be in fluid communication with the second manifold portion. Each first heat-transfer tube can have an outer surface and an inner surface defining a first conduit. Each spacer can be disposed along the array of first heat-transfer tubes between the first and second manifold portions. Each spacer can have a plurality of openings therein. Each first heat-transfer tube can pass through a corresponding one of the openings in each spacer. For each first heat-transfer tube in a cross-sectional view perpendicular to the first direction, the outer surface can form a first shape that is non-circular, and the inner surface can form a second shape different than the first shape.

In another representative embodiment, a heat exchanger comprises first and second manifold portions, an array of substantially-parallel first heat-transfer tubes between the first and second manifold portions, and one or more spacers. Each first heat-transfer tube can extend along a first direction. A first end of each first heat-transfer tube can be in fluid communication with the first manifold portion, and a second end of each first heat-transfer tube can be in fluid communication with the second manifold portion. Each first heat-transfer tube can have an outer surface and an inner surface defining a first conduit. Each spacer can be disposed along the array of first heat-transfer tubes between the first and second manifold portions. Each spacer can have a plurality of openings therein. Each first heat-transfer tube can pass through a corresponding one of the openings in each spacer. For each first heat-transfer tube in a cross-sectional view perpendicular to the first direction, the outer surface can form a first shape and the inner surface can form a second shape. At least one of the first shape and the second shape can lack reflectional symmetry with respect to all lines in the cross-sectional view.

In another representative embodiment, a method for fabricating a heat exchanger can comprise inserting an array of substantially-parallel heat-transfer tubes along a first direction into a spacer pack. The spacer pack can comprise a plurality of spacers. Each spacer can have a plurality of openings therein. Each heat-transfer tube can be received in a corresponding one of the openings of each spacer and can extend along the first direction between a first end and a second end thereof. The method can further comprise sliding the plurality of spacers along the first direction to respective positions within the array of heat-transfer tubes. At least some of the positions can spaced apart along the first direction from others of the positions. A first spacer of the plurality of spacers can be disposed at a first position proximal to the first ends of the heat-transfer tubes. The method can also comprise coupling the first spacer at the first position to the heat-transfer tubes to form a first header. The method can further comprise inserting the first ends of the heat-transfer tubes into a first slot of a first manifold portion, such that the first spacer of the first header contacts a facing surface of the first manifold portion adjacent the first slot. The method can also comprise coupling the first header to the first manifold portion via the first spacer.

In another representative embodiment, a method for fabricating a heat exchanger can comprise inserting an array of substantially-parallel heat-transfer tubes along a first direction into a spacer pack. The spacer pack can comprise a plurality of spacers. Each spacer can have a plurality of first openings therein. Each heat-transfer tube can be received in a corresponding one of the first openings of each spacer and can extend along the first direction between a first end and a second end thereof. The method can further comprise sliding the plurality of spacers along the first direction to respective positions within the array of heat-transfer tubes. At least some of the positions can be spaced apart along the first direction from others of the positions. A first spacer of the plurality of spacers can be disposed at a first position proximal to the first ends of the heat-transfer tubes. The method can also comprise inserting the first ends of the heat-transfer tubes into respective second openings of a first manifold portion. The method can further comprise coupling the heat-transfer tubes to the first manifold portion.

In another representative embodiment, a method for fabricating a heat exchanger can comprise inserting an array of substantially-parallel heat-transfer tubes along a first direction into a spacer pack. The spacer pack can comprise a plurality of spacers. Each spacer can have a plurality of first openings therein. Each heat-transfer tube can be received in a corresponding one of the first openings of each spacer. Each heat-transfer tube can extend along the first direction between a first end and a second end thereof. The method can further comprise sliding the plurality of spacers along the first direction to respective positions within the array of heat-transfer tubes. At least some of the positions can be spaced apart along the first direction from others of the positions. A first spacer of the plurality of spacers can be disposed at a first position proximal to the first ends of the heat-transfer tubes. The method can also comprise inserting the first ends of the heat-transfer tubes into a core pack within a mold. In some embodiments, one or more spacers can be embedded within the mold. The method can further comprise filling the mold with a molten material so as to surround the core pack and the first ends of the heat-transfer tubes. The method can also comprise cooling the molten material to form a manifold portion cast-in-place around the first ends of the heat-transfer tubes. The molten material can comprise a metal or metal alloy. In some embodiments, the one or more spacers can be embedded within the cast-in-place manifold portion.

In another representative embodiment, a method for fabricating a heat exchanger can comprise inserting an array of substantially-parallel heat-transfer tubes along a first direction into a spacer pack. The spacer pack can comprise a plurality of spacers. Each spacer can have a plurality of first openings therein. Each heat-transfer tube can be received in a corresponding one of the first openings of each spacer. Each heat-transfer tube can extend along the first direction between a first end and a second end thereof. The method can further comprise, prior to or after the inserting, sealing the first ends of the heat-transfer tubes. The method can also comprise sliding the plurality of spacers along the first direction to respective positions within the array of heat-transfer tubes. At least some of the positions can be spaced apart along the first direction from others of the positions. A first spacer of the plurality of spacers can be disposed at a first position proximal to the first ends of the heat-transfer tubes. The method can further comprise coupling the sealed first ends of the heat-transfer tubes to a first header. The method can also comprise, after the coupling, cutting the first header in a direction perpendicular to the first direction, so as to slice through sealed first end portions of each heat-transfer tube and to expose the first ends. In some embodiments, the exposed first ends are open, and a remaining portion of the header includes one or more spacers embedded therein. The method can further comprise attaching a first mating member to the cut first header so as to form a first manifold portion. The first mating member can have at least one recess in fluid communication with one or more of the exposed first ends of the heat-transfer tubes.

Any of the various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosed technology will become more apparent from the following detailed description, which proceeds with reference to the accompanying figures.

BRIEF DESCRIPTION OF THE DRAWINGS

Embodiments will hereinafter be described with reference to the accompanying drawings, which have not necessarily been drawn to scale. Where applicable, some elements may be simplified or otherwise not illustrated in order to assist in the illustration and description of underlying features. Throughout the figures, like reference numerals denote like elements.

FIG. 10A-10B are side and perspective views, respectively, of an exemplary spacer with flow-enhancing protrusions, according to one or more embodiments of the disclosed subject matter.

FIG. 10C is a detailed side view of one of the flow-enhancing protrusions in the exemplary spacer of FIG. 10B.

FIGS. 11A-11C illustrate an exemplary assembly of a heat-transfer tube array for a heat exchanger using multiple comb-style spacers, according to one or more embodiments of the disclosed subject matter.

DETAILED DESCRIPTION

General Considerations

Figure 1A:
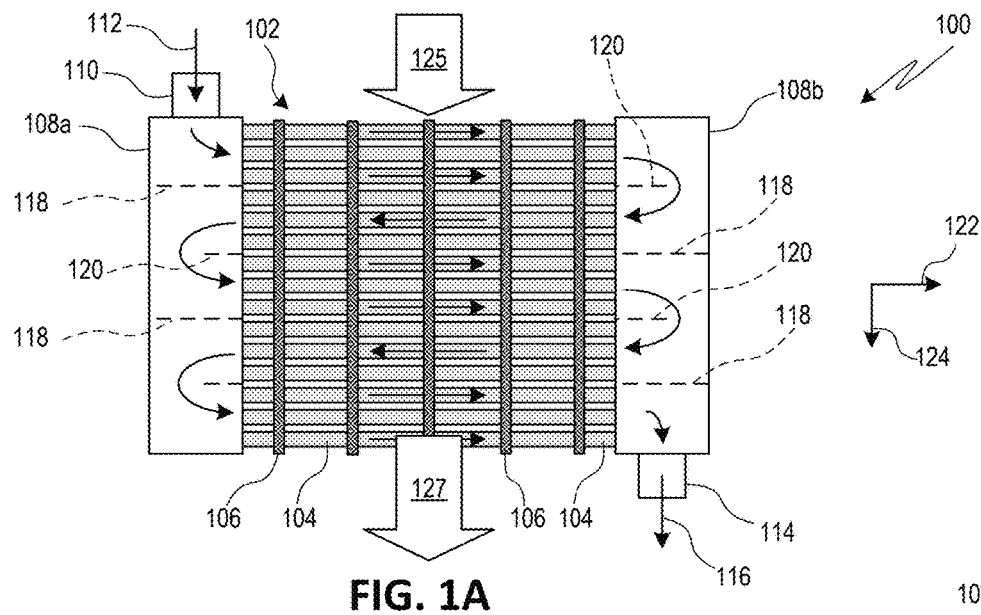
FIG. 1A is a simplified schematic diagram of an exemplary configuration for a cross-flow heat exchanger, according to one or more embodiments of the disclosed subject matter.

For purposes of this description, certain aspects, advantages, and novel features of the embodiments of this disclosure are described herein. The disclosed methods and systems should not be construed as being limiting in any way. Instead, the present disclosure is directed toward all novel and nonobvious features and aspects of the various disclosed embodiments, alone and in various combinations and sub-combinations with one another. The methods and systems are not limited to any specific aspect or feature or combination thereof, nor do the disclosed embodiments require that any one or more specific advantages be present, or problems be solved. The technologies from any embodiment or example can be combined with the technologies described in any one or more of the other embodiments or examples. In view of the many possible embodiments to which the principles of the disclosed technology may be applied, it should be recognized that the illustrated embodiments are exemplary only and should not be taken as limiting the scope of the disclosed technology.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods, as known to those of ordinary skill in the art. When directly and explicitly distinguishing embodiments from discussed prior art, the embodiment numbers are not approximates unless the word "about" is recited. Whenever "substantially," "approximately," "about," or similar language is explicitly used in combination with a specific value, variations up to and including 10% of that value are intended, unless explicitly stated otherwise.

Directions and other relative references may be used to facilitate discussion of the drawings and principles herein, but are not intended to be limiting. For example, certain terms may be used such as "inner," "outer,", "upper," "lower," "top," "bottom," "interior," "exterior," "left," "right," "front," "back," "rear," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part and the object remains the same.

As used herein, "comprising" means "including," and the singular forms "a" or "an" or "the" include plural references unless the context clearly dictates otherwise. The term "or" refers to a single element of stated alternative elements or a combination of two or more elements, unless the context clearly indicates otherwise.

Although there are alternatives for various components, parameters, operating conditions, etc. set forth herein, that does not mean that those alternatives are necessarily equivalent and/or perform equally well. Nor does it mean that the alternatives are listed in a preferred order, unless stated otherwise. Unless stated otherwise, any of the groups defined below can be substituted or unsubstituted.

Although dimensions, materials, and methods similar or equivalent to those described herein can be used in the practice or testing of the presently disclosed subject matter, suitable dimensions, materials, and methods are described below. The dimensions, materials, methods, and examples are illustrative only and not intended to be limiting. Features of the presently disclosed subject matter will be apparent from the following detailed description and the appended claims.

INTRODUCTION

Disclosed herein are exemplary cross-flow heat exchanger systems, components thereof, and methods for fabrication of such heat exchanger systems and components. Heat-transfer tubes having a round cross-section are often used in conventional heat exchanger systems, but such round tubes may limit performance of the heat exchanger, for example, due to relatively high hydraulic resistance. While flat heat-transfer tubes can offer lower hydraulic resistance, they have suffer from degraded heat transfer characteristics. In contrast, the disclosed embodiments utilize specifically parameterized tubes that are designed to maximize, or at least increase, performance with respect to multiple operational and design criteria.

In some embodiments, the method of parameterization can employ a Non-Uniform Rational B-Splines (NURBS) method to generate an appropriate geometry of each heat-transfer tube. The resulting heat-transfer tubes can have an outer heat-transfer surface that forms a non-circular shape in cross-sectional view, for example, a teardrop or droplet shape. Alternatively or additionally, the outer heat-transfer surface of each tube, an internal conduit of each tube, or both can have respective shapes in cross-sectional view that are asymmetrical. In some embodiments, the internal conduit of each heat-transfer tube can have a cross-sectional shape that is different from the outer heat-transfer surface, for example, to improve structural integrity and/or manufacturability of the tubes.

The disclosed heat-transfer tubes and heat exchanger systems incorporating the same can offer a better balance between hydraulic resistance and heat-transfer characteristics, thereby leading to optimal, or at least improved, performance. Embodiments of the disclosed subject matter may be used in commercial or residential HVAC&R systems or any other application where a first flow of fluid (e.g., gas, liquid, or combinations thereof, such as two-phase fluid or phase-changing fluid) is heated or cooled by thermal interaction with a second flow of fluid. Moreover, embodiments of the disclosed subject matter can be applied to systems of any scale, for example, micro-scale (e.g., maximum dimensions less of 1 cm or less) to industrial scale (e.g., maximum dimensions of 1 m or greater).

Heat Exchanger System

Figure 1B:
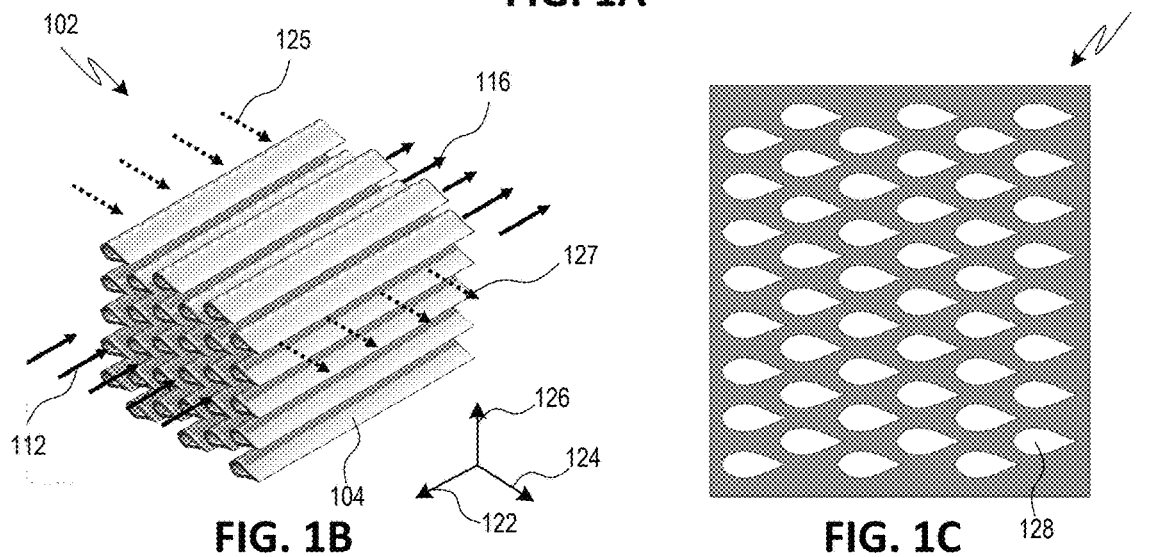
FIG. 1B is a simplified isometric view of an isolated array of heat-transfer tubes with exemplary non-circular cross-sectional shapes, according to one or more embodiments of the disclosed subject matter.

FIGS. 1A-1B illustrate an exemplary configuration of a cross-flow heat exchanger (CFHX) system 100, according to one or more embodiments of the disclosed subject matter. The CFHX system 100 has an array 102 of heat-transfer tubes 104, for example, hundreds or even thousands of tubes arranged in a staggered (e.g., hexagonal lattice) or in-line (e.g., square or rectangular lattice) configuration. The heat-transfer tubes 104 can each extend substantially parallel to each other and to a first direction 122 (also referred to as a length direction of the tubes 104, a direction of extension of the tubes, or a direction of internal fluid flow). The array 102 is disposed along the first direction 122 between a first manifold 108a and a second manifold 108b, with one end of the tubes 104 being in fluid communication with the first manifold 108a and the opposite end of the tubes 104 being in fluid communication with the second manifold 108b. Thus, an inlet flow 112 of first fluid (e.g., gas, liquid, or combinations thereof) is introduced to inlet port 110 of the first manifold 108a. The first fluid flows through the internal conduits of the heat-transfer tubes 104 to the second manifold 108b and exits the second manifold 108b via outlet port 114 as outlet flow 116.

In some embodiments, the first manifold 108a, the second manifold 108b, or both can contain flowpath features therein that direct fluid flow therethrough. In the illustrated example, the first manifold 108a and the second manifold 108b include separator walls 118 and baffles 120 to redirect the flow back and forth through the array 102, for example, to increase an amount of time to which the first fluid flowing between inlet port 110 and outlet port 114 can be subjected to heat exchange. Accordingly, although the inlet port 110 and outlet port 114 are illustrated as being on separate manifolds, the use of separator walls 118 and/or baffles 120 within the respective manifolds can allow a single manifold to have both the inlet and outlet ports (e.g., ports on opposite ends of the manifold).

In some embodiments, the first and second manifolds 108a, 108b can be portions of the same manifold. For example, a common manifold can include a separator that divides a first manifold portion (e.g., functioning similar to first manifold 108a) from a second manifold portion (e.g., functioning similar to second manifold 108b). Alternatively or additionally, a common manifold can rely on fluid flow characteristics to functionally separate the first manifold portion from the second manifold portion, for example, based on phase differences within the flowing fluid.

In operation of the CFHX 100, an inlet flow 125 of second fluid (e.g., gas, liquid, or combinations thereof) is provided to the array 102 of heat-transfer tubes 104 in a direction crossing the first direction 122. In the illustrated example, the inlet flow 125 is along a second direction 124 (also referred to as a width direction of the tubes 104, a first cross-sectional direction of the tubes, or a direction of external fluid flow) that is substantially perpendicular to the direction of extension of tubes 104 and/or the flow of first fluid through tubes 104; however, other directions that are at a non-orthogonal and non-zero angle with respect to the direction of extension of tubes 104 are also possible. The inlet flow 125 of second fluid passes through the array 102 (e.g., through the spaces between adjacent tubes 104) and exits as outlet flow 127 on an opposite side, with the second fluid exchanging heat with the first fluid flowing through tubes 104 as it does so.

In some embodiments, the first fluid flowing through tubes 104 via manifolds 108a, 108b is a liquid (e.g., refrigerant) and the second fluid flowing externally over tubes 104 is a gas (e.g., air). In other embodiments, at least one of the first fluid and the second fluid is a gas, and the other of the first and second fluid can be a gas, liquid, two-phase fluid, or phase-changing fluid. In some embodiments, the first fluid and the second fluid may have the same chemical composition but be at different temperatures and/or in different phases (e.g., gaseous or liquid phase). In some embodiments, the first fluid, the second fluid, or both can enter CFHX system 100 in one phase and exit in a different phase due to the heat exchange. In some embodiments, the first fluid, the second fluid, or both can enter, exit, and/or exist within the CFHX system 100 in multiple phases (e.g., as a transient two-phase flow, a separated two-phase flow, or a dispersed two-phase flow). In some embodiments, the first fluid, the second fluid, or both is comprised of multiple constituent materials, for example, a mixture of two or more fluids.

Figure 1C:
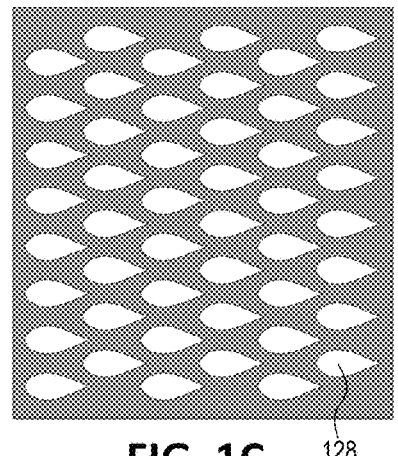
FIG. 1C is a side view of an isolated spacer for supporting and/or assembling an array of heat-transfer tubes in a heat exchanger, according to one or more embodiments of the disclosed subject matter.

To manufacture the CFHX system 100, one or more spacers can be used to hold the heat-transfer tubes 104 in place, to maintain desired spacing (e.g., pitch) between the tubes of the array 102. During operation of the CFHX 100, the disposition of one or more spacers within the tube array 102 can also reinforce the tubes 104 against internal pressure resulting from the first fluid flowing therein. In the illustrated example of FIG. 1A, multiple spacers 106 can be disposed at respective locations within the tube array 102, equally spaced from each other along the first direction 122 or otherwise. Each spacer can be a thin (e.g., 1 cm or less in thickness, for example, less than 1 mm) piece of material (e.g., plastic, metal such as copper or aluminum, etc.) having openings therein through which the tubes 104 of the array 102 are inserted. For example, as shown in FIG. 1C, each spacer 106 can have multiple openings 128, with each opening corresponding to a respective one of the tubes 104. Each opening 128 in the spacer 106 can have a shape similar to the cross-sectional shape of the respective tube 104 passing therethrough and a size slightly larger (e.g., 1-10% in cross-sectional area) than the respective tube 104 passing therethrough. Alternatively, each opening 128 can have a shape different than that of the respective tube 104 (e.g., a circular shape versus non-circular for tube 104) and a size sufficient to allow the tube 104 to be inserted into the opening. The spacer 106 can be formed by punch and die, chemical etching, laser machining, additive manufacturing (e.g., 3-D printing), or any other manufacturing technique. In some embodiments, the openings 128 in the spacer 106 are formed with a high degree of accuracy, for example, less than or equal to 0.05 mm for openings having a maximum cross-sectional dimension of about 4 mm (e.g., as low as 0.013 mm).

As shown in FIG. 1B, the heat-transfer tubes 104 of the array 102 have an outer heat-transfer surface that interacts with the second fluid flow (e.g., inlet flow 125 to outlet flow 127) and at least one internal conduit through which the first fluid flows (e.g., inlet flow 112 to outlet flow 116). Each heat-transfer tube 104 has a cross-section defined by a plane perpendicular to its direction of extension, e.g., defined by second direction 124 and a third direction 126 (also referred to as a height direction of the tubes 104, a second cross-sectional direction of the tubes, or a direction orthogonal to both fluid flows). In particular, the outer heat-transfer surface of each tube 104 forms a non-circular shape in its respective cross-section. In the illustrated embodiment, each tube 104 has an outer surface forming a teardrop or droplet shape (e.g., a shape defined by a piriform curve or surface, a pear-shaped curve, a teardrop curve, or half of a lemniscate) in the cross-section. Alternatively, in some embodiments, each tube 104 has an outer surface forming a shape that is completely asymmetrical in the cross-section (e.g., lacks reflectional symmetry with respect to all lines in the cross-section).

Figure 1D:
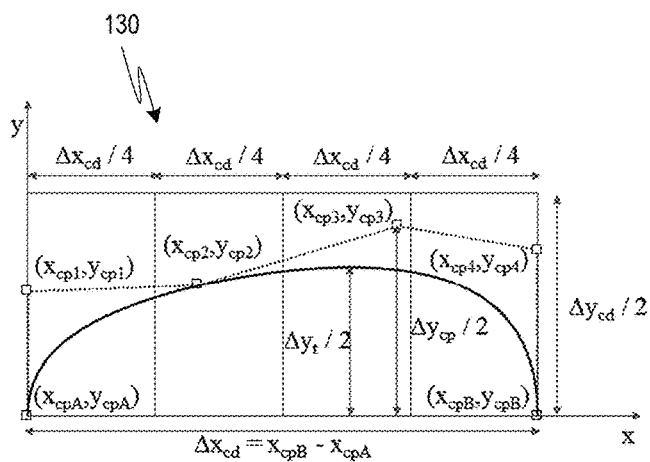
FIG. 1D illustrates exemplary parameterized generation of outer surface shape for heat-transfer tubes based on non-uniform rational B-spline, according to one or more embodiments of the disclosed subject matter.
Figure 1E:
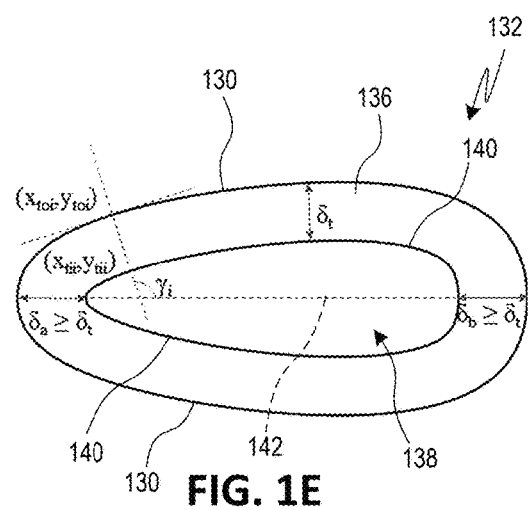
FIG. 1E illustrates exemplary parameterized generation of a cross-sectional geometry for heat transfer tubes based on the outer surface shape of FIG. 1D, according to one or more embodiments of the disclosed subject matter.

To determine the non-circular shape for the outer heat-transfer surface of the tubes, a parameterized methodology can be employed. Parameterization of tube shape can give more control over the flow regime at different Reynolds numbers, whereas for tubes with circular cross-sectional shapes, the boundary layer detachment and secondary flow (e.g., wake region) effects are inevitable irrespective of heat exchanger application or tube size. In some embodiments, tube shape parameterization can employ a Non-Uniform Rational B-Splines (NURBS) algorithm to generate the outer non-circular surface of each tube. As shown in FIG. 1D, three or more control points can be used to generate a curve 130 that defines at least part of the outer surface of the tube. In the illustrated example of FIGS. 1D-1E, the curve 130 can be reflected across a lateral axis 142 (e.g., substantially parallel to second direction 124 and/or the direction of second fluid flow) to generate the appropriate cross-sectional shape 132 for the tube. Alternatively, the parameterized methodology can generate separate curves for different parts of the outer surface, for example to yield an asymmetrical cross-section.

In some embodiments, the parameterization methodology can be separately applied to define a cross-sectional shape of the inner conduit 138, as defined by inner surface 140. Alternatively, in some embodiments, the cross-sectional shape of inner surface 140 can be selected to have a different shape than that of the outer surface, for example, to improve manufacturability or enhance tube strength. For example, the inner surface 140 can be selected to avoid sharp corners, which could otherwise cause stress concentrations that make the resulting tube susceptible to failure during operation. Alternatively or additionally, the shape, size, and/or location of the conduit can be selected to allow sufficient structural support by sidewall 136, for example, by avoiding narrowed sidewall regions. In some embodiments, the construction of the heat-transfer tubes with the selected inner surface geometry allows the heat-transfer tubes to sustain normal operating pressures (e.g., 3-6 MPa), as well as the substantially higher pressures required for safety certifications (e.g., 18-36 MPa), without failure.

Figure 2A:
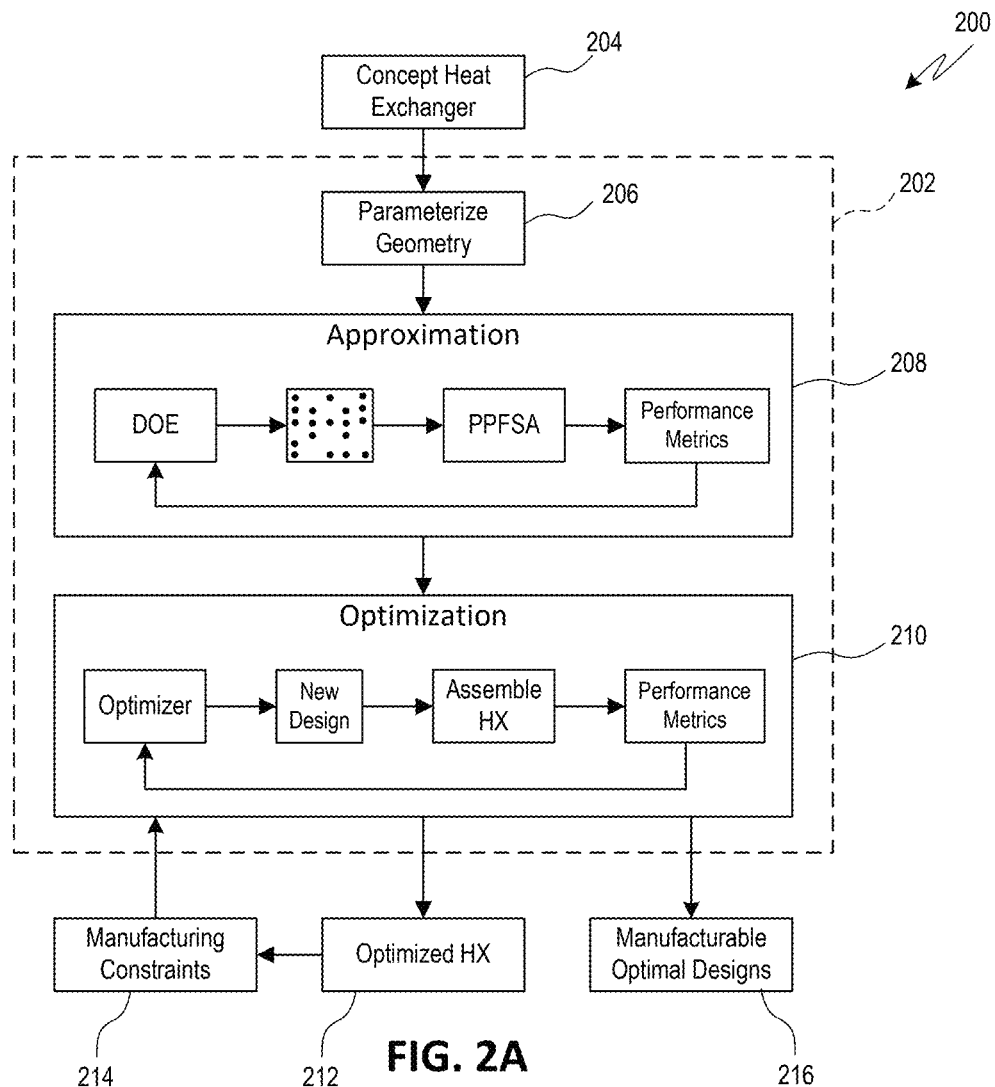
FIG. 2A is a simplified schematic diagram of a computerized system or framework for heat exchanger design optimization, according to one or more embodiments of the disclosed subject matter.
Figure 3A:
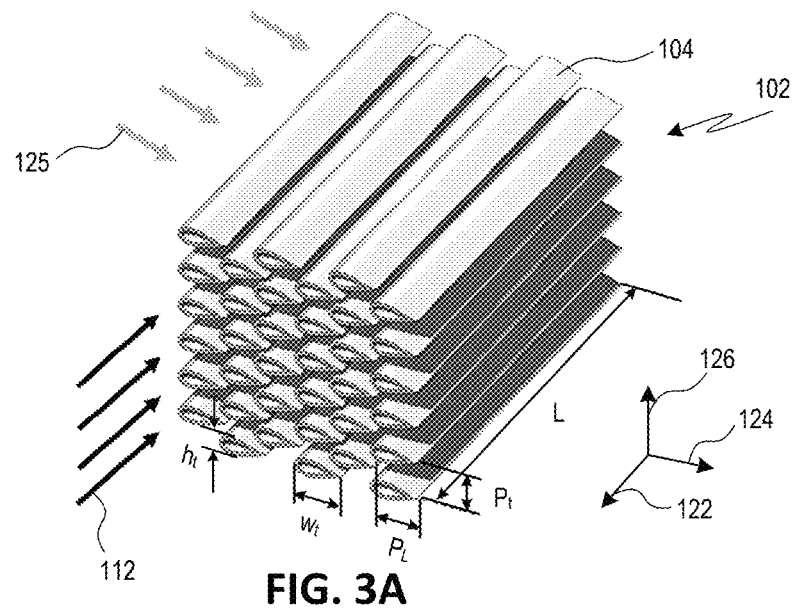
FIG. 3A shows the isolated array of heat-transfer tubes with exemplary configuration parameters for optimization, according to one or more embodiments of the disclosed subject matter.
Figure 3B:
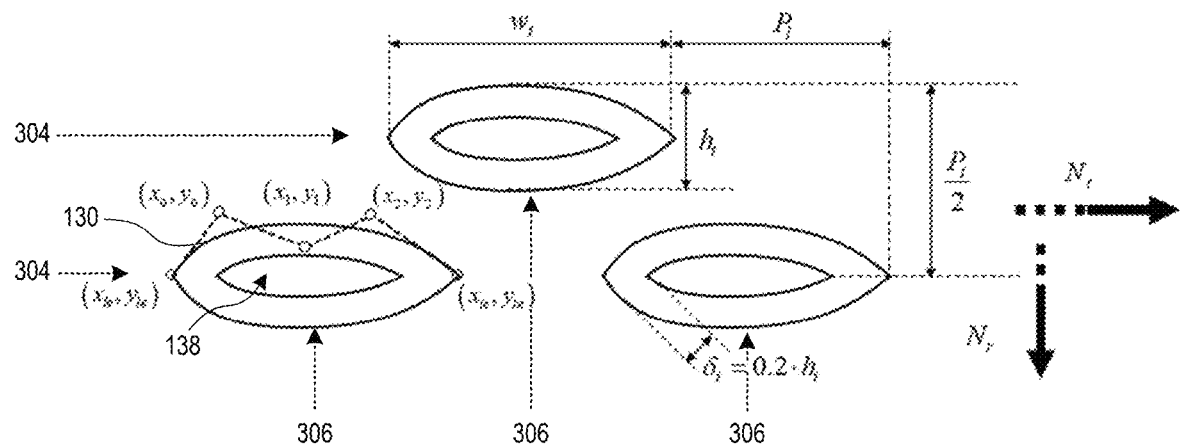
FIG. 3B is a simplified cross-sectional view of a portion of the array of heat-transfer tubes with exemplary configuration parameters for optimization, according to one or more embodiments of the disclosed subject matter.
Figure 3C:
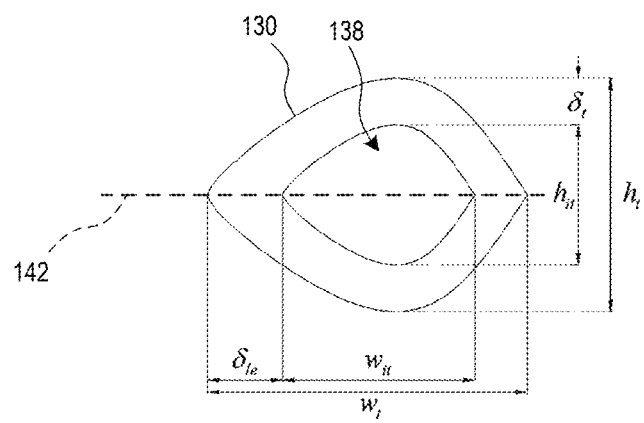
FIG. 3C is a simplified cross-sectional view of a generalized shape for a heat-transfer tube with exemplary configuration parameters for optimization, according to one or more embodiments of the disclosed subject matter.

Referring to FIG. 2A, a software framework 200 for performing the parameterization methodology is schematically illustrated. An initial heat exchanger design concept (e.g., requirements to be satisfied for a particular application, including desired fluids, performance, etc.) is provided to design system 202, which includes one or more software modules. For example, design system 202 can include a first module 206 designed to parameterize geometry of components of the desired heat exchanger system. Parameters defined and considered by the system can include curve 130 defining the outer heat-transfer surface shape of the heat-transfer tubes (e.g., as shown in FIG. 1D), tube width (e.g., $w_t$ as shown in FIGS. 3A-3C), tube height (e.g., $h_t$ as shown in FIGS. 3A-3C), pitch (e.g., lateral pitch $P_L$ between tubes in different rows 304 and vertical pitch Pt between tubes in the same column 306, as shown in FIGS. 3A-3B), tube length (e.g., length L as shown in FIG. 3A, along a longitudinal axis of the tube). In some embodiments, the parameterization can also include tube wall thickness (e.g., thickness $\delta_{le}$ or thickness $\delta_t$ in FIGS. 3B-3C), inner conduit width (e.g., width $w_{it}$ in FIG. 3C), and inner conduit height (e.g., height hit in FIG. 3C). Alternatively, in some embodiments, the shape of the inner conduit 138 (defined by inner surface 140) can be otherwise predefined, for example, as part of the initial concept 204 or as part of manufacturing constraints 214 provided to the system 202.

For example, in some embodiments, each heat-transfer tube can have a maximum dimension in the cross-sectional view (e.g., either tube width, $w_t$, or tube height, $h_t$) that is less than or equal to 4 mm. Alternatively or additionally, in some embodiments, each heat-transfer tube can have a length, L, of between 2 cm and 1.5 m, inclusive, for example, 0.02-0.1 m or 0.15-1.5 m. Alternatively, in some embodiments, each heat-transfer tube can have a length, L, of greater than 1.5 m, for example, about 3 m. Other dimensions are also possible according to one or more contemplated embodiments.

The design system 202 can further include a second module 208 configured to employ an iterative analysis to approximate fluid and structural characteristics. For example, the second module 208 can employ a parallel parameterized fluid and structural analysis (PPFSA) meta-modeling that finds thermal-hydraulically optimal heat exchanger designs with shape-optimized tube cross-sections that satisfy the performance metrics for the desired heat exchanger system. Such performance metrics can include, but are not limited to, fluid pressure drop, heat transfer coefficients for internal and external flows, tube stress, internal wetted perimeters, fluid volume, tube material, heat load, etc. Since optimization of tube shape for thermal-hydraulic properties alone may result in a structurally-deficient tube construction, the PPFSA can combine automated CFD simulations with automated structural analysis simulations using finite element analysis. Metamodels from the second module 208 can be provided to third module 210, which optimizes system parameters by calculating airside thermal-hydraulic characteristics while using built-in correlations to evaluate the internal fluid flow within the tubes with appropriate correction factors.

The optimization outputs 212 contain all the HX models evaluated and a file containing the Pareto set. An exemplary output of parameters for the tube configuration of FIG. 3C is shown in Tables 1-2 below. Manufacturing constraints 214 can be further used by third module 210 to generate a design or set of designs 216 that have optimal performance characteristics and that are more readily manufacturable. Further details regarding software framework 200 and the heat exchanger design optimization process can be found in the Dissertation entitled "Airside Passive Heat Transfer Enhancement, Using Multi-Scale Analysis and Shape Optimization, For Compact Heat Exchangers with Small Characteristic Lengths," University of Maryland, College Park, published online Jan. 25, 2017, which is hereby incorporated by reference herein in its entirety.

TABLE 1

Parameters for heat-transfer tube shapes, where $h_t$ is height of tube outer shape height, $w_t$ is width of tube outer shape, $\delta_t$ is tube thickness, $h_{it}$ is height of tube inner shape, $w_{it}$ is width of tube inner shape, and $\delta_{le}$ is tube thickness at the flow leading edge, as shown in FIG. 3C (all dimensions in mm).

| Index | $h_t$ | $w_t$ | $\delta_t$ | $h_{it}$ | $w_{it}$ | $\delta_{le}$ |
|---|---|---|---|---|---|---|
| S1 | 0.8020 | 1.3099 | 0.1604 | 0.4812 | 0.7860 | 0.2838 |
| S2 | 0.8084 | 1.1055 | 0.1617 | 0.4850 | 0.6633 | 0.2602 |
| S3 | 0.8000 | 1.6008 | 0.1600 | 0.4800 | 0.9605 | 0.1890 |
| S4 | 0.8022 | 1.0233 | 0.160 | 0.4813 | 0.6140 | 0.2025 |
| S5 | 0.8014 | 1.2009 | 0.160 | 0.4808 | 0.7205 | 0.2287 |
| S6 | 0.8154 | 1.3208 | 0.163 | 0.4893 | 0.7925 | 0.2643 |
| S7 | 0.8000 | 1.4030 | 0.160 | 0.4800 | 0.7873 | 0.1887 |

TABLE 2

Performance for heat-transfer tube shapes, percent reduction compared to baseline conditions, where $V_{HX}$ is heat exchanger envelope volume, Air ΔP is air-side pressure drop, FA is face area, $V_{Mat}$ is heat exchanger material volume, $V_{Int}$ is heat exchanger internal volume, and $M_{Charge}$ is refrigerant charge amount within the heat exchanger.

| Index | $V_{HX}$ | Air ΔP | FA | $V_{Mat}$ | $V_{Int}$ | $M_{Charge}$ |
|---|---|---|---|---|---|---|
| S1 | −52.2% | −59.0% | −0.3% | −48.8% | −53.1% | −51.6% |
| S2 | −43.3% | −63.5% | −0.3% | −41.6% | −46.5% | −45.0% |
| S3 | −69.2% | −26.9% | −18.6% | −52.3% | −56.3% | −50.0% |
| S4 | −38.4% | −20.3% | −19.1% | −42.6% | −47.4% | −42.7% |
| S5 | −28.2% | −28.9% | −19.1% | −32.6% | −38.3% | −31.9% |
| S6 | −20.1% | −32.5% | −19.1% | −25.2% | −31.5% | −23.9% |

Figure 2B:
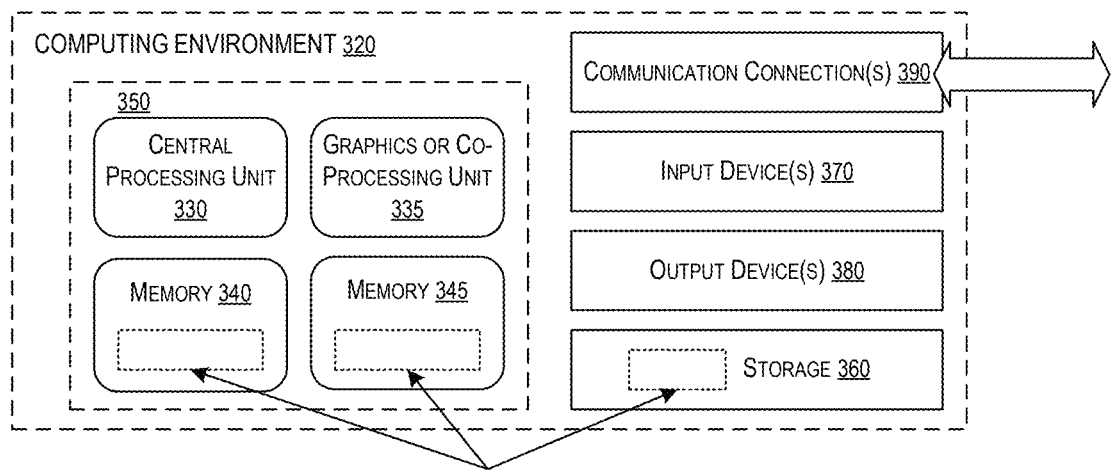
FIG. 2B is a simplified schematic diagram depicting a generalized example of a computing environment in which the disclosed technologies may be implemented, according to one or more embodiments of the disclosed subject matter.

FIG. 2B depicts a generalized example of a suitable computing environment 320 in which the described innovations may be implemented, such as software framework 200, design system 202, or one or more of modules 206-210. The computing environment 320 is not intended to suggest any limitation as to scope of use or functionality, as the innovations may be implemented in diverse general-purpose or special-purpose computing systems. For example, the computing environment 320 can be any of a variety of computing devices (e.g., desktop computer, laptop computer, server computer, tablet computer, etc.). In some embodiments, the computing environment is an integral part of a tissue analysis system. Alternatively, in some embodiments, the computing environment is a separate system connected to the tissue analysis system, for example, by making operative electrical connections (e.g., wired or wireless) to the tissue analysis system or components thereof.

With reference to FIG. 2B, the computing environment 320 includes one or more processing units 330, 335 and memory 340, 345. In FIG. 2B, this basic configuration 350 is included within a dashed line. The processing units 330, 335 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 2B shows a central processing unit 330 as well as a graphics processing unit or co-processing unit 335. The tangible memory 340, 345 may be volatile memory (e.g., registers, cache, RAM), non-volatile memory (e.g., ROM, EEPROM, flash memory, etc.), or some combination of the two, accessible by the processing unit(s). The memory 340, 345 stores software 325 implementing one or more innovations described herein, in the form of computer-executable instructions suitable for execution by the processing unit(s).

A computing system may have additional features. For example, the computing environment 320 includes storage 360, one or more input devices 370, one or more output devices 380, and one or more communication connections 390. An interconnection mechanism (not shown) such as a bus, controller, or network interconnects the components of the computing environment 320. Typically, operating system software (not shown) provides an operating environment for other software executing in the computing environment 320, and coordinates activities of the components of the computing environment 320.

The tangible storage 360 may be removable or non-removable, and includes magnetic disks, magnetic tapes or cassettes, CD-ROMs, DVDs, or any other medium which can be used to store information in a non-transitory way, and which can be accessed within the computing environment 320. The storage 360 can store instructions for the software 325 implementing one or more innovations described herein.

The input device(s) 370 may be a touch input device such as a keyboard, mouse, pen, or trackball, a voice input device, a scanning device, or another device that provides input to the computing environment 320. The output device(s) 370 may be a display, printer, speaker, CD-writer, or another device that provides output from computing environment 320.

The communication connection(s) 390 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. In any of the above described examples and embodiments, provision of a request (e.g., data request), indication (e.g., data signal), instruction (e.g., control signal), or any other communication between systems, components, devices, etc. can be by generation and transmission of an appropriate electrical signal by wired or wireless connections.

Heat-Transfer Tube Examples

Figure 4A:
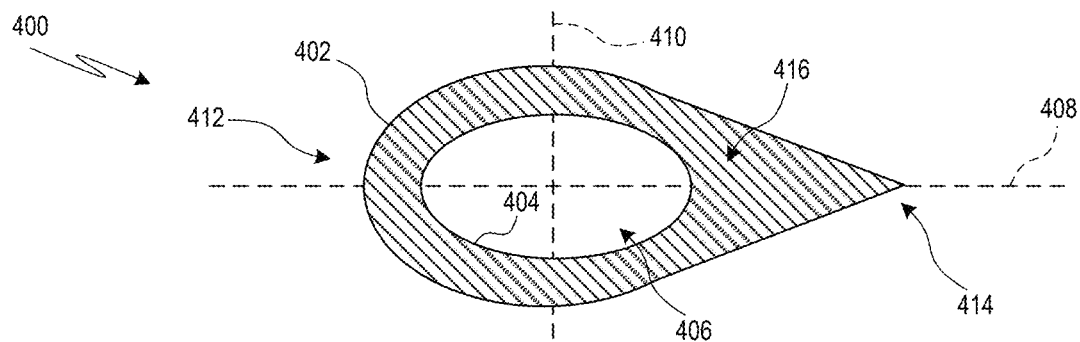
FIG. 4A is a simplified cross-sectional view of a heat-transfer tube configuration having an outer surface with non-circular shape and a single internal conduit, according to one or more embodiments of the disclosed subject matter.

As discussed above, in some embodiments, each heat-transfer tube in the array can have an outer surface in cross-sectional view that forms a first shape that is non-circular, and an inner surface in cross-sectional view that defines the inner conduit and forms a second shape that is different than the first shape. In some embodiments, the first shape for the outer surface 402 of the heat-transfer tube 400 can be a teardrop or droplet shape (e.g., a shape defined by a piriform curve or surface, a pear-shaped curve, a teardrop curve, or half of a lemniscate) with a leading bulbous end 412 and a trailing tail end 414, for example, as shown in FIG. 4A. Although trailing end 414 is shown as a point, practical embodiments may instead have a non-zero width or be rounded, filleted, or chamfered features at the tail end, for example, to improve manufacturability and/or reduce stress concentrations.

Figure 4B:
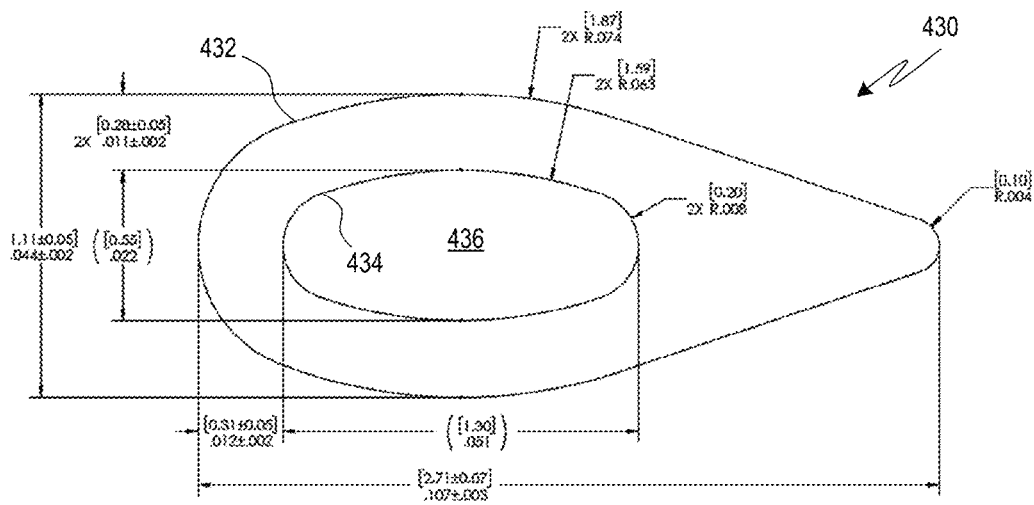
FIGS. 4B-4C are simplified cross-sectional views of exemplary heat-transfer tubes according to the configuration of FIG. 4A. Dimensions illustrated in the figures are in millimeters.
Figure 4C:
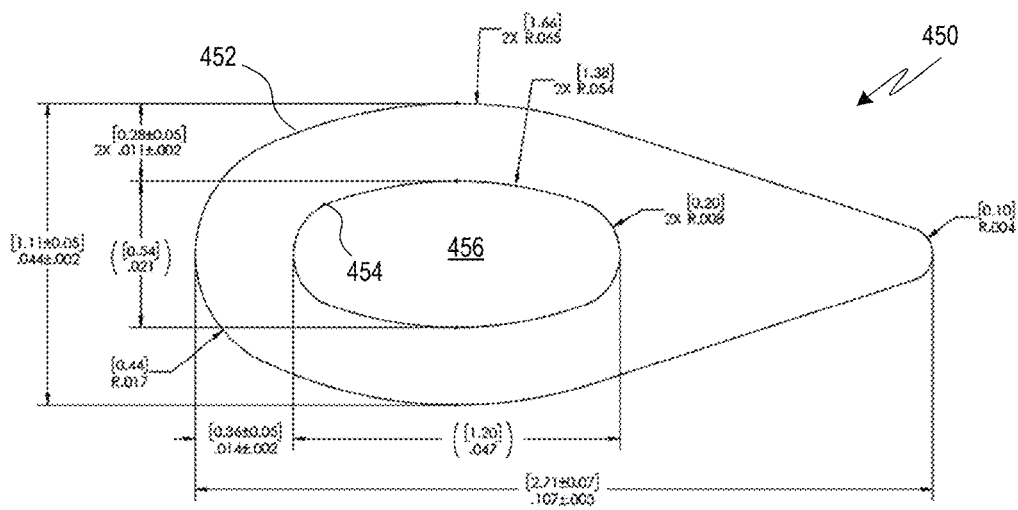

Meanwhile, the second shape for the inner surface 404 defining inner conduit 406 in the cross-sectional view of FIG. 4A is an ellipse or oval. Other cross-sectional shapes for inner surface 404 are also possible according to one or more contemplated embodiments. For example, inner surface 404 can form a substantially circular shape. FIG. 4B illustrates a first example of a heat-transfer tube 430 according to the configuration of FIG. 4A, where outer surface 432 has a droplet shape and inner surface 434 defining conduit 436 has an elliptical shape. FIG. 4C illustrates a second example of a heat-transfer tube 450 according to the configuration of FIG. 4A, where outer surface 452 also has a droplet shape and inner surface 454 defining conduit 456 has an elliptical shape. The configurations of tube 430 and tube 450 are similar, but differ with respect to some dimensions. Nevertheless, the dimensions indicated in the figures are intended to be exemplary only, and other dimensions are also possible based on operational and manufacturing details associated with a particular heat transfer application. For example, heat-transfer tubes of different sizes can be generated by simply scaling (e.g., maintaining the same ratios) the dimensions illustrated in the figures.

Returning to FIG. 4A, the heat-transfer tube 400 can thus have reflectional symmetry about lateral axis 408. In some embodiments, the lateral axis 408 of the heat-transfer tube 400 can be aligned with (e.g., substantially parallel to) the second direction 124, with the bulbous end 412 facing incoming fluid flow (e.g., inlet flow 125). The heat-transfer tube 400 can also have a vertical axis 410, which extends perpendicular to the lateral axis 408 and can be aligned with (e.g., substantially parallel to) the third direction 126. In some embodiments, the vertical axis 410 can extend through a portion of the cross-section of the tube 402 having the largest dimension along axis 410, and/or the vertical axis 410 can extend through a center of inner conduit 406. In some embodiments, the vertical axis 410 may be disposed closer to the leading bulbous end 412 than to the trailing tail end 414. By avoiding sharp edges within region 416 and/or increasing a thickness of the tube wall within region 416 between conduit 406 and tail end 414, the heat-transfer tube 400 may have improved ability (e.g., increased rigidity) to tolerate operating pressures from fluid flowing therethrough.

Figure 5A:
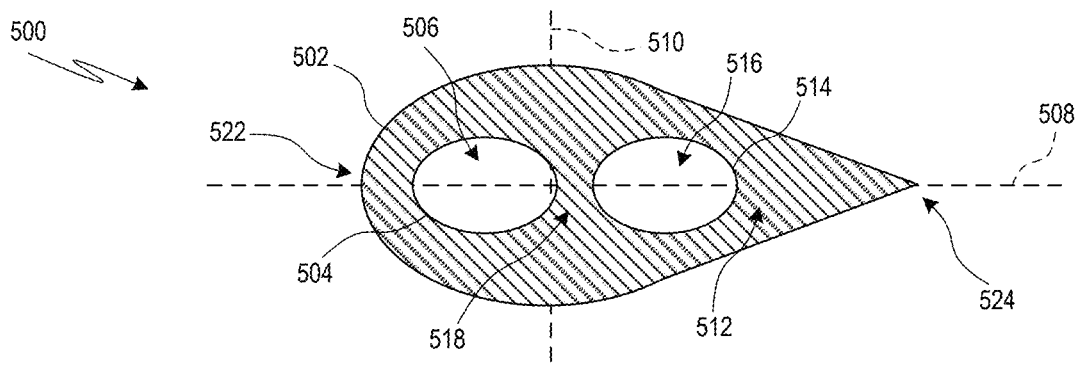
FIG. 5A is a simplified cross-sectional view of a heat-transfer tube configuration having an outer surface with non-circular shape and a pair of internal conduits, according to one or more embodiments of the disclosed subject matter.
Figure 5B:
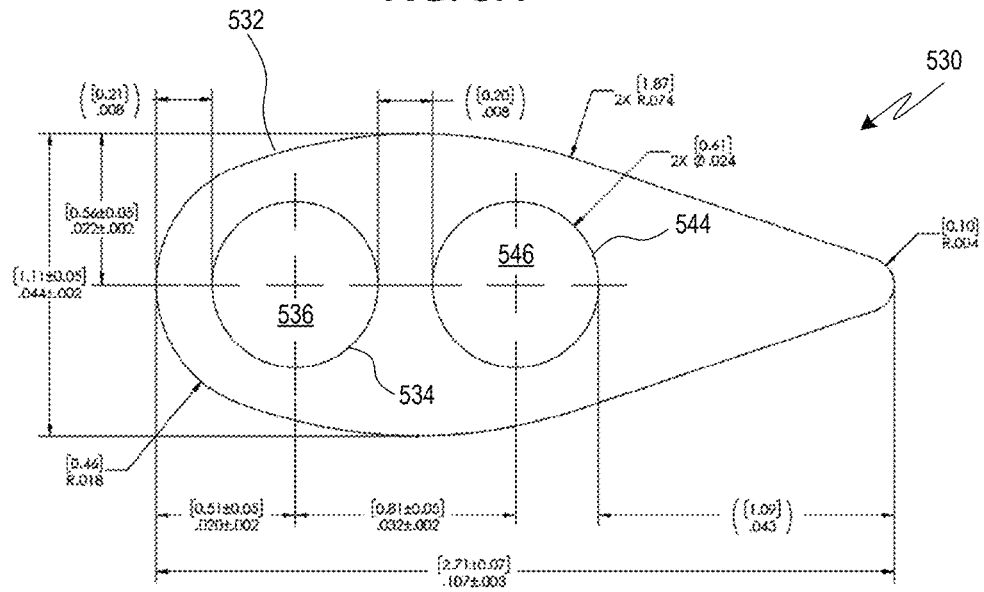
FIGS. 5B-5C are simplified cross-sectional views of exemplary heat-transfer tubes according to the configuration of FIG. 5A. Dimensions illustrated in the figures are in millimeters.

Alternatively, in some embodiments, the heat-transfer tube can include multiple internal conduits, at least one of which has a different cross-sectional shape than the outer surface of the tube. Again, in some embodiments, the first shape for the outer surface 502 of heat-transfer tube 500 can be a teardrop or droplet shape with a leading bulbous end 522 and a trailing tail end 524, as shown in FIG. 5A. A first inner surface 504 defines a first internal conduit 506, and a second inner surface 514 defines a second internal conduit 516 spaced between the first internal conduit 506 and the trailing tail end 524. In the illustrated example of FIG. 5A, the shape for each inner surface 504, 514 is an ellipse or oval. However, other cross-sectional shapes for one or both of inner surfaces 504, 514 are also possible according to one or more contemplated embodiments. Moreover, the inner surfaces can have the same shape as each other or be different from each other.

Figure 5C:
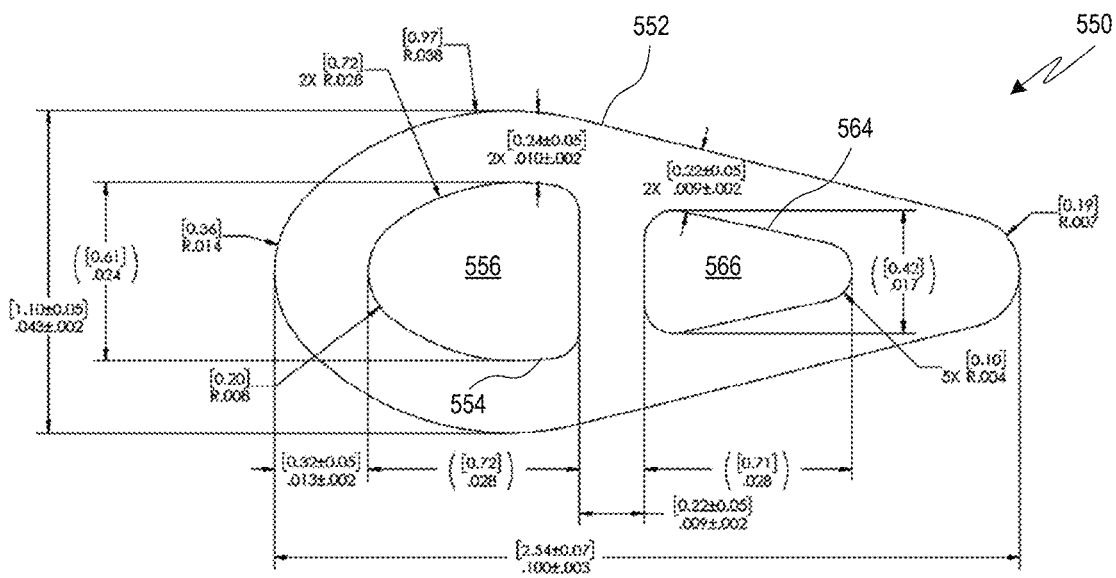

FIG. 5A illustrates a first example of a heat-transfer tube 530 according to the configuration of FIG. 5A, where outer surface 532 has a droplet shape, inner surface 534 defining first conduit 536 has a circular shape, and inner surface 544 defining second conduit 546 has a circular shape. FIG. 5C illustrates a second example of a heat-transfer tube 550 according to the configuration of FIG. 5A, where outer surface 552 also has a droplet shape, inner surface 554 defining first conduit 556 has a truncated oval or droplet shape (e.g., truncated at or near point of maximum dimension with respect to cross-axis 510), and inner surface 564 defining second conduit 566 has a triangular shape. Note that in FIG. 5C, corners that would normally be associated with a triangular shape have been rounded, for example, to avoid stress concentrations and/or to improve manufacturability; nevertheless, the shape of conduit 566 is generally triangular in cross-section. Similarly, corners produced by strict truncation of a shape forming the first conduit 556 are rounded to avoid stress concentrations and/or improve manufacturability; nevertheless, the conduit 556 retains the general shape despite the rounding. Although dimensions have been indicated in the figures, such dimensions are intended to be exemplary only, and other dimensions are also possible based on operational and manufacturing details associated with a particular heat transfer application. For example, heat-transfer tubes of different sizes can be generated by simply scaling (e.g., maintaining the same ratios) the dimensions illustrated in the figures.

Returning to FIG. 5A, the heat-transfer tube 500 can have reflectional symmetry about lateral axis 508. In some embodiments, the lateral axis 508 of the heat-transfer tube 500 can be aligned with (e.g., substantially parallel to) the second direction 124, with the bulbous end 522 facing incoming fluid flow (e.g., inlet flow 125). The heat-transfer tube 500 can also have a vertical axis 510, which extends perpendicular to the lateral axis 508 and can be aligned with (e.g., substantially parallel to) the third direction 126. In some embodiments, the vertical axis 510 can extend through a portion of the cross-section of the tube 500 having the largest dimension along axis 510, and/or the vertical axis 510 can extend through a center of region 518 between conduits 506, 516. Alternatively or additionally, in some embodiments, at least part of the first conduit 506 can overlap with the vertical axis 510, and/or no part of the second conduit 516 overlaps with the vertical axis 510. In some embodiments, the vertical axis 510 may be disposed closer to the leading bulbous end 522 than to the trailing tail end 524. By avoiding sharp edges within region 518 and/or increasing a thickness of the tube wall within region 518 between conduit 506 and tail end 524, the heat-transfer tube 500 may have improved ability (e.g., increased rigidity) to tolerate operating pressures from fluid flowing therethrough. Further enhancements to structural rigidity of the heat-transfer tube 500 can be provided by the central region 518 between the first and second conduit 506, 516.

Figure 6:
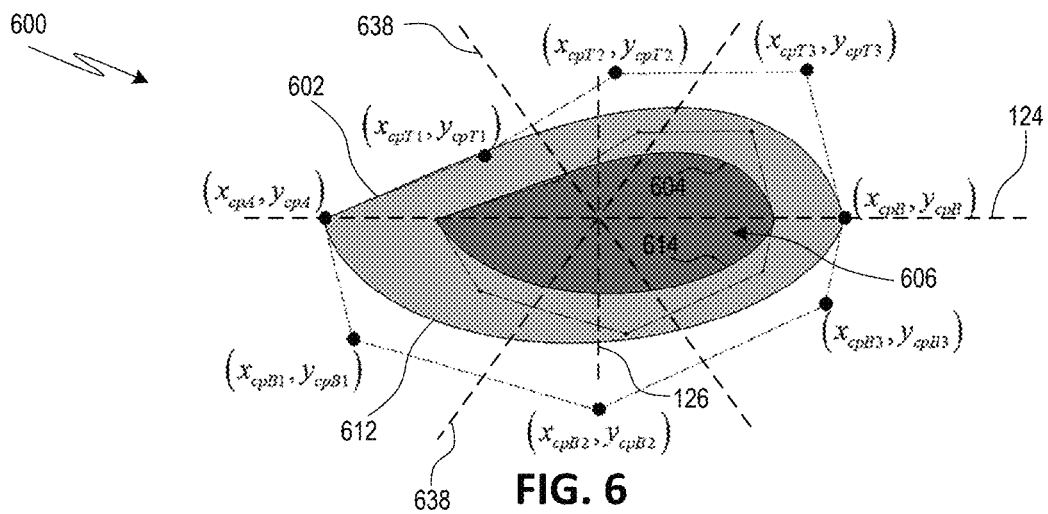
FIG. 6 is a simplified cross-sectional view of an asymmetrical heat-transfer tube configuration, according to one or more embodiments of the disclosed subject matter.

In some embodiments, at least the outer surface of the heat-transfer tube can have a shape in cross-sectional view that is completely asymmetric (e.g., that lacks reflectional symmetry with respect to any direction in the cross-sectional view). For example, FIG. 6 illustrates an exemplary asymmetric heat-transfer tube 600 having an upper outer surface portion 602 defined by a first parameterized curve (e.g., NURBS curve) and a lower outer surface portion 612 defined by a second parameterized curve (e.g., NURBS curve). The upper and lower outer surface portions 602, 612 can be optimized independently of each other, such that the resulting outer surface shape lacks symmetry with respect to second direction 124 and third direction 126, as well as any other direction 638 within the cross-section. In some embodiments, the inner surface of the heat-transfer tube can also have a shape in cross-sectional view that is completely asymmetric, for example, based on independent optimizations of upper inner surface portion 604 and lower inner surface portion 614. The independent optimizations may not only result in an asymmetric shape for inner conduit 606 defined by inner surface portions 604, 616, but may also yield a shape for the inner surface different than that of the outer shape.

Tube Array Examples

In some embodiments, CFHX systems can employ non-uniform array configuration that is arranged serially, parallel, or both with respect to the cross-flowing fluid 125. As used herein, non-uniform array configuration refers to arrays of heat-transfer tubes within the same system that differ with respect to at least one of tube cross-sectional shape (e.g., outer surface, inner surface, or both), tube size (e.g., cross-sectional dimensions, length, or both), tube pitch (e.g., spacing between rows, spacing between columns, or both), tube arrangement (e.g., staggered, in-line, random), or any combination thereof. By separately optimizing characteristics of heat-transfer tube arrays at different points within the CFHX system, performance under field operating conditions (e.g., fouling, frosting, or both) can be improved.

Figure 7A:
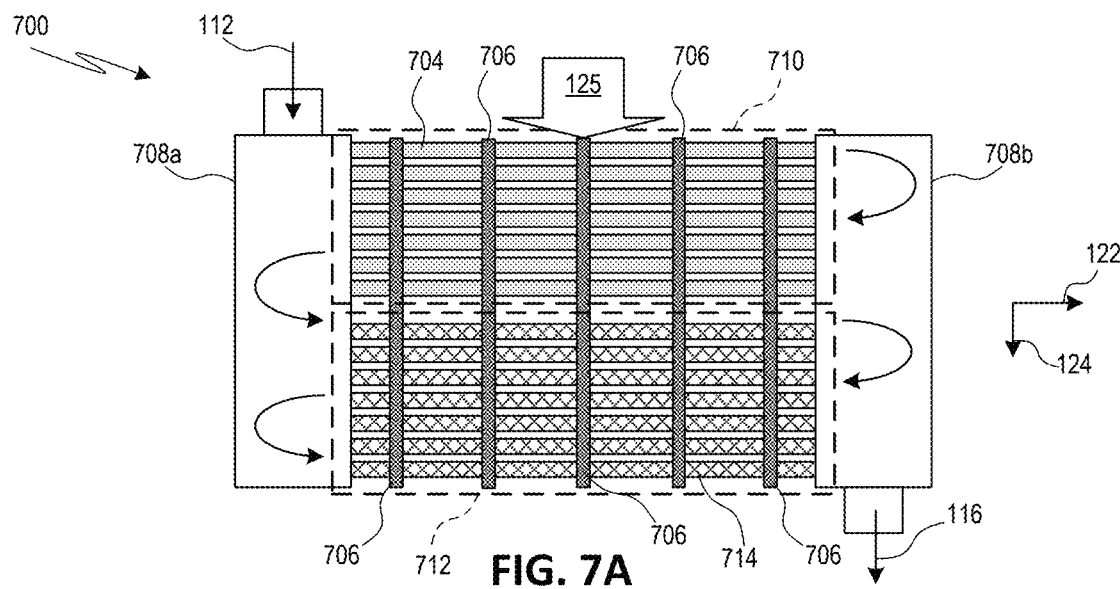
FIG. 7A is a simplified schematic diagram of an exemplary configuration for a cross-flow heat exchanger employing serially-arranged arrays of heat-transfer tubes with different configurations, according to one or more embodiments of the disclosed subject matter.

FIG. 7A illustrates an exemplary CFHX system 700 employing serially-arranged heat-transfer tube arrays in a non-uniform configuration. Similar to system 100 in FIG. 1A, CFHX system 700 has a pair of manifolds 708a, 708b that directs an inlet flow 112 of first fluid to and collects an outlet flow 116 of first fluid from heat-transfer tubes fluidically coupled therebetween. However, system 700 has a first array 710 of heat-transfer tubes 704 and a second array 712 of heat-transfer tubes 714. A common set of spacers 706 can support both the first array 710 and the second array 712. Alternatively, separate, independent spacers can be provided for each array 710, 712. The first array 710 can be arranged before the second array 712 with respect to an inlet flow 125 of the second fluid, such that the second fluid interacts with and exchanges heat between the tubes 704 of the first array 710 before interacting with and exchanging heat between the tubes 714 of the second array 712. The first and second arrays 710, 712 can be different from each other with respect to tube cross-sectional shape, tube size, tube pitch, tube arrangement, or any combination thereof.

Figure 7B:
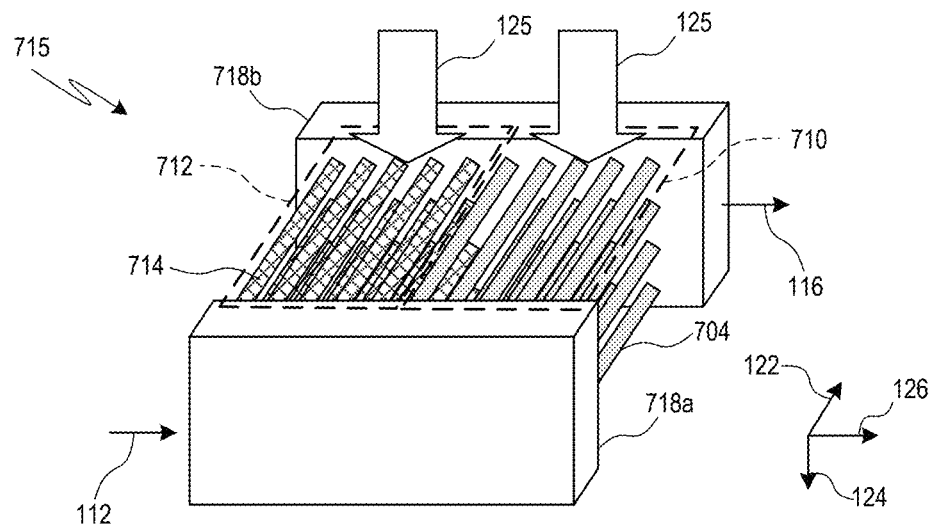
FIG. 7B is a simplified schematic diagram of an exemplary configuration for a cross-flow heat exchanger employing parallel-arranged arrays of heat-transfer tubes with different configurations, according to one or more embodiments of the disclosed subject matter.

FIG. 7B illustrates an exemplary CFHX system 715 employing parallel-arranged heat-transfer tube arrays in a non-uniform configuration. Similar to system 700 in FIG. 7A, CFHX system 715 has a pair of manifolds 718a, 718b that direct an inlet flow 112 of first fluid to and collect an outlet flow 116 of first fluid from heat-transfer tubes fluidically coupled therebetween. System 715 also has a first array 710 of heat-transfer tubes 704 and a second array 712 of heat-transfer tubes 714. However, the first array 710 and the second array 712 are arranged similarly with respect to inlet flow 125 of the second fluid, such that the interaction between the second fluid and tubes 704, 714 of the first and second arrays 710, 712 occur at the same time. As discussed above, the first and second arrays 710, 712 in FIG. 7B can be different from each other with respect to tube cross-sectional shape, tube size, tube pitch, tube arrangement, or any combination thereof. Note that spacers are not shown in FIG. 7B for clarity of illustration; however, spacers 706 can be provided in a manner similar to that described above for FIG. 7A.

Figure 7C:
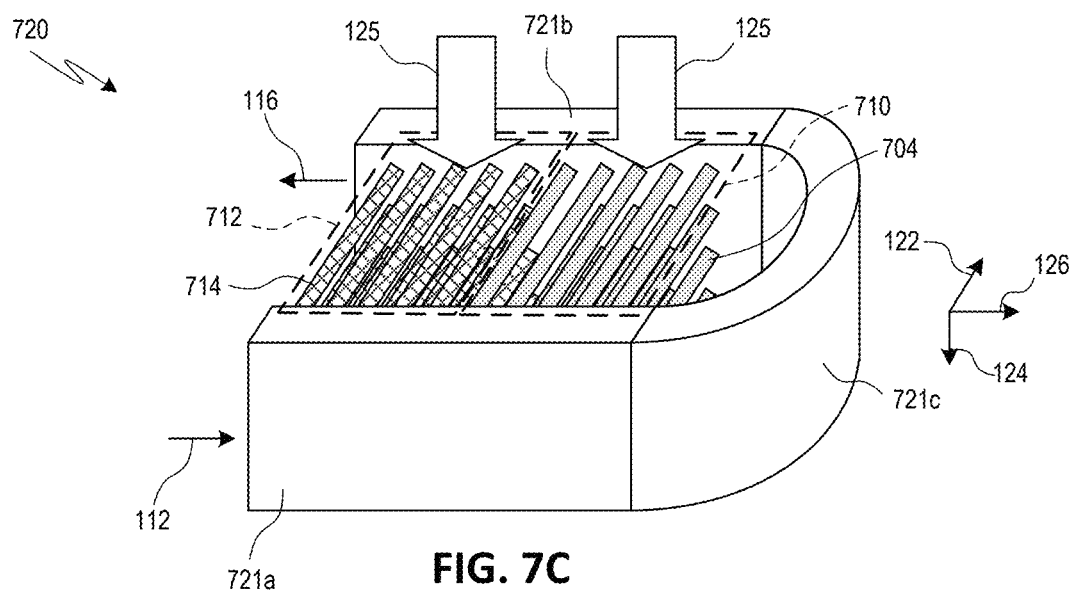
FIG. 7C is a simplified schematic diagram of an exemplary configuration for a cross-flow heat exchanger employing a single manifold, according to one or more embodiments of the disclosed subject matter.

FIG. 7C illustrates another exemplary CFHX system 720 employing parallel-arranged heat-transfer tube arrays in a non-uniform configuration. Similar to system 715 in FIG. 7B, CFHX system 720 has a first array 710 and a second array 712 arranged similarly with respect to inlet flow 125 of the second fluid. However, the system 720 has a single manifold with a connecting portion 721c coupling together a first manifold portion 721a and a second manifold portion 721b in a substantially U-shaped configuration. First manifold portion 721a can direct inlet flow 112 of first fluid to the first and second arrays 710, 712 of heat-transfer tubes 704, 714, while second manifold portion 721b can collect outlet flow 116 of first fluid from the heat-transfer tubes 704, 714. In some embodiments, the connecting portion 721c, a part of the first manifold portion 721a adjacent the connecting portion 721c, a part of the second manifold portion 721b adjacent the connecting portion 721c, or any combination thereof can include a separator that prevents direct fluid flow (e.g., without first passing through a heat-transfer tube) between the first and second manifold portions 721a, 721b. Alternatively, in some embodiments, phase differences of fluid therein can effectively separate the first and second manifold portions 721a, 721b despite being directly coupled together by connecting portion 721c. As discussed above, the first and second arrays 710, 712 in FIG. 7C can be different from each other with respect to tube cross-sectional shape, tube size, tube pitch, tube arrangement, or any combination thereof. Note that spacers are not shown in FIG. 7C for clarity of illustration; however, spacers 706 can be provided in a manner similar to that described above for FIG. 7A.

Figure 7D:
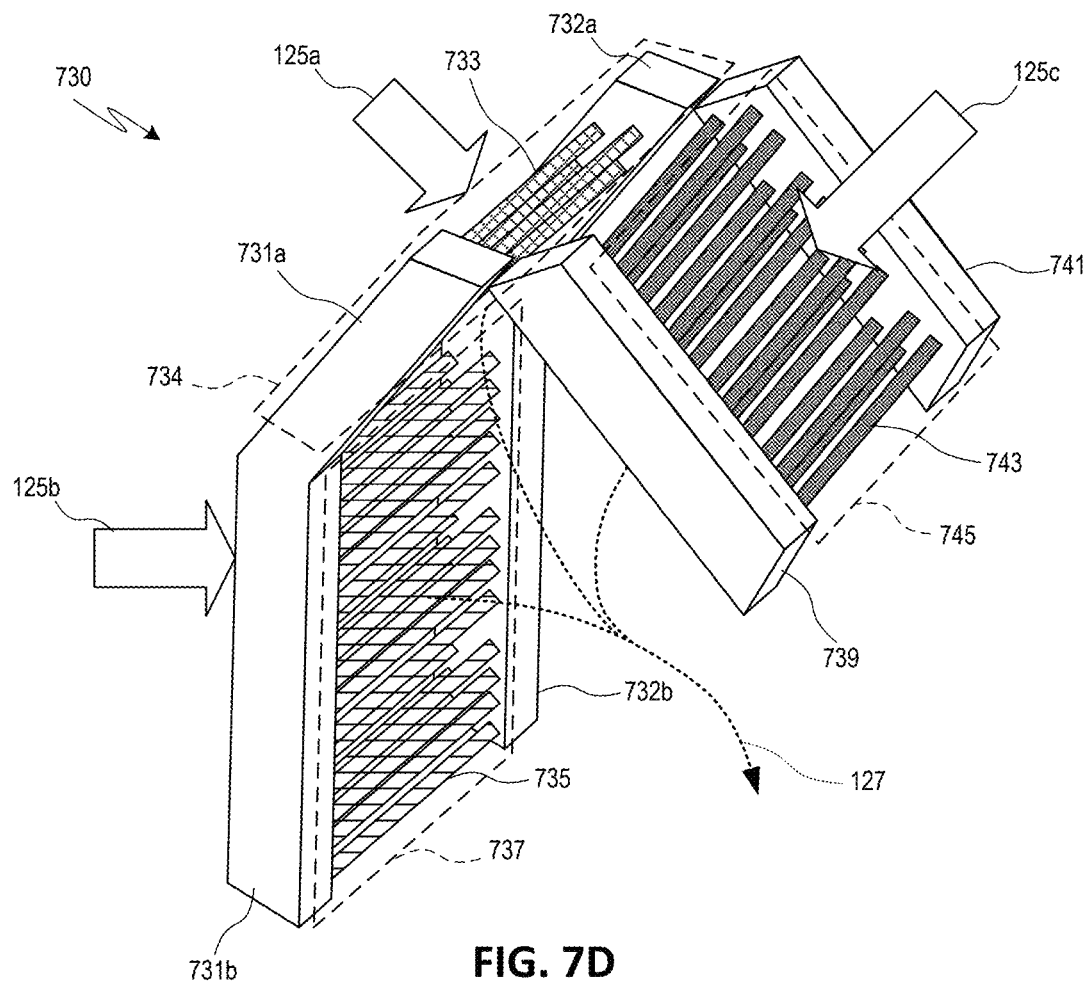
FIG. 7D is a simplified schematic diagram of an exemplary configuration for a cross-flow heat exchanger employing one or more complex-shaped manifolds, according to one or more embodiments of the disclosed subject matter.

Arrays of heat-transfer tubes having different configurations can be assembled together with manifolds (or portions thereof) having complex shapes to tailor heat-exchanger geometry and performance to a particular application. For example, FIG. 7D shows another CFHX system 730 employing parallel-arranged heat-transfer tube arrays in a complex geometry. System 730 includes a first manifold having an upper portion 731*a* and a lower portion 731*b*, and a second manifold having an upper portion 732*a* and a lower portion 732*b*. Between the upper portions 731*a*, 732*a* of the first and second manifold extend a first array 734 of heat-transfer tubes 733, arranged with respect to a first part of the inlet flow 125*a*. Between the lower portions 731*b*, 732*b* of the first and second manifold extend a second array 737 of heat-transfer tubes 735, arranged with respect to a second part of the inlet flow 125*b*. A third manifold 739 (which may be separate from the first manifold or a connected portion of the first manifold) and a fourth manifold 741 (which may be separate from the second manifold or a connected portion of the second manifold) can also be provided. Between the third manifold 739 and the fourth manifold 741 extend a third array 745 of heat-transfer tubes 743, arranged with respect to a third part of the inlet flow 125*c*. The outlet flows having passed through their respective heat-transfer tube arrays 734, 737, 745 can merge together to form a single stream outlet flow 127. Although not illustrated, connections may be provided between manifolds or different portions thereof to direct the flow from heat-transfer tubes in one array to the inlet of heat-transfer tubes of another array, for example, from array 734 to array 737, from array 734 to array 745, from array 737 to array 734, or vice versa.

Figure 7E:
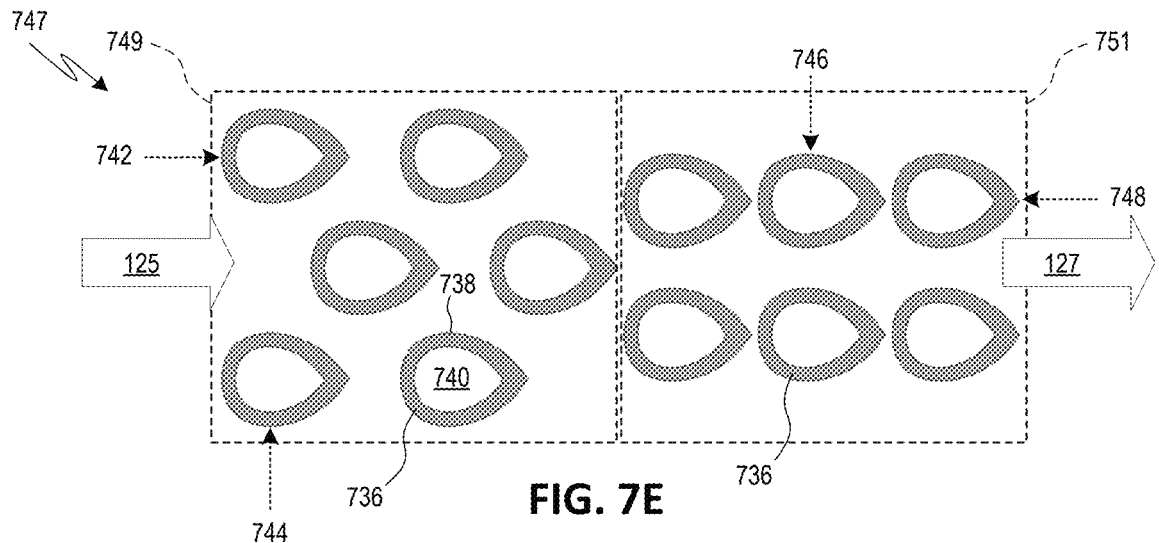
FIGS. 7E-7G are simplified cross-sectional views of exemplary configurations of different heat-transfer tube arrays for a heat exchanger, according to one or more embodiments of the disclosed subject matter.

FIG. 7E illustrates an example of a non-uniform configuration 747 for a heat-exchanger system. In the illustrated example, a first sub-array 749 has a staggered arrangement of heat-transfer tubes 736, and a second sub-array 751 has an inline arrangement of heat-transfer tubes 736. In non-uniform configuration 747, the first and second sub-arrays are arranged sequentially with respect to the crossing fluid flow, with the first sub-array 749 being at a leading end (e.g., proximal inlet flow 125) and the second sub-array 751 being at a trailing end (e.g., proximal outlet flow 127). An opposite serial arrangement (e.g., with the second sub-array 751 being at a leading end) or a parallel arrangement (e.g., with first and second sub-arrays 749, 751 receiving inlet flow 125 substantially simultaneously) is also possible according to one or more contemplated embodiments.

In the staggered arrangement of the first sub-array 749, tubes 736 in one row 742 are offset from tubes in an immediately adjacent row 742, and tubes 736 in one column 744 are offset from tubes in an immediately adjacent column 744. The tubes 736 in a particular row 742 or a column 744 may otherwise be substantially aligned with each other (e.g., respective lateral or vertical axes being collinear, or at least a geometric center of the tubes being disposed on a common line). In the inline arrangement of the second sub-array 751, tubes 736 in one row 748 are aligned with tubes in an immediately adjacent row 748, and tubes 736 in one column 746 are aligned with tubes in an immediately adjacent column 746. In the illustrated example, the tubes in first sub-array 749 have the same geometry as the tubes in the second sub-array 751. That is, the shape of the outer surface 738 and the shape of the internal conduit 740 of each tube 736 is substantially identical between the first and second sub-arrays 749, 751. In addition to the different tube arrangements, the pitch of tubes 736 (e.g., the spacing between adjacent rows 742 and/or columns 744) within the first sub-array 749 can be different from that within the second sub-array 751, as illustrated in FIG. 7E.

Figure 7F:
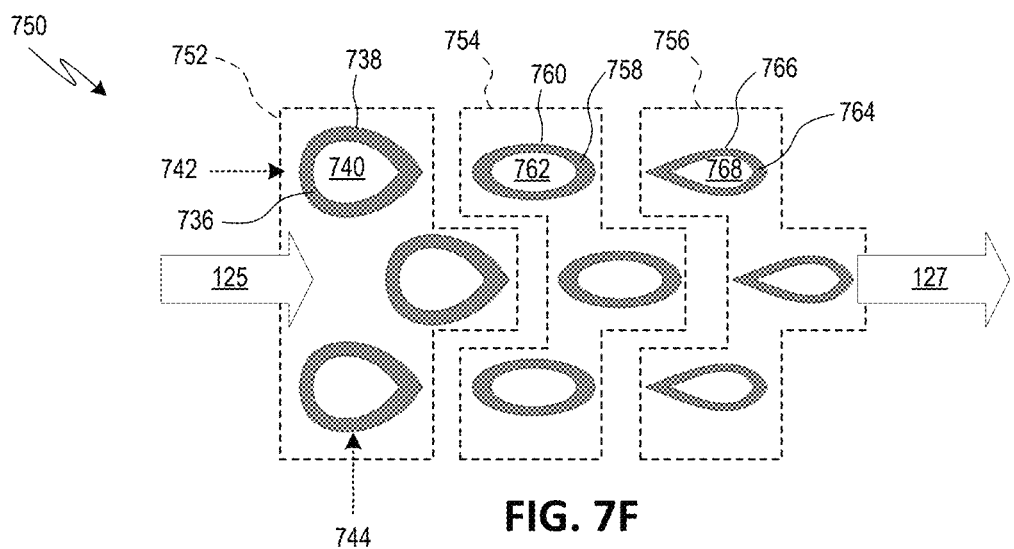

Alternatively or additionally, in some embodiments, the geometry of the tubes in the second sub-array can be different than that of the tubes in the first sub-array. For example, FIG. 7F illustrates another non-uniform configuration 750 employing different tube geometries. In the illustrated example, a first sub-array 752 has a staggered arrangement of first heat-transfer tubes 736, a second sub-array 754 has a staggered arrangement of second heat-transfer tubes 758, and a third sub-array 756 has a staggered arrangement of third heat-transfer tubes 764. In non-uniform configuration 750, the first through third sub-arrays are arranged sequentially with respect to the crossing fluid flow, with the first sub-array 752 being at a leading end (e.g., proximal inlet flow 125) and the third sub-array 756 being at a trailing end (e.g., proximal outlet flow 127). An opposite serial arrangement (e.g., with the third sub-array 756 being at a leading end) or a parallel arrangement (e.g., with first through third sub-arrays 752, 754, 756 receiving inlet flow 125 substantially simultaneously) is also possible according to one or more contemplated embodiments.

Within first sub-array 752, each tube 736 can have the same first geometry (e.g., with respect to outer surface 738 and inner conduit 740 shapes). Similarly, within second sub-array 754, each tube 758 can have the same second geometry (e.g., with respect to outer surface 760 and inner conduit 762 shapes), and, within third sub-array 756, each tube 764 can have the same third geometry (e.g., with respect to outer surface 766 and inner conduit 768 shapes). Between the different sub-arrays, however, the tube geometry is different. Nevertheless, each of the first through third sub-arrays has the same pitch and same staggered arrangement, such that tubes in each row 742 are substantially aligned with each other and tubes in each column 744 are substantially aligned with each other despite being in different sub-arrays and having different shapes.

Figure 7G:
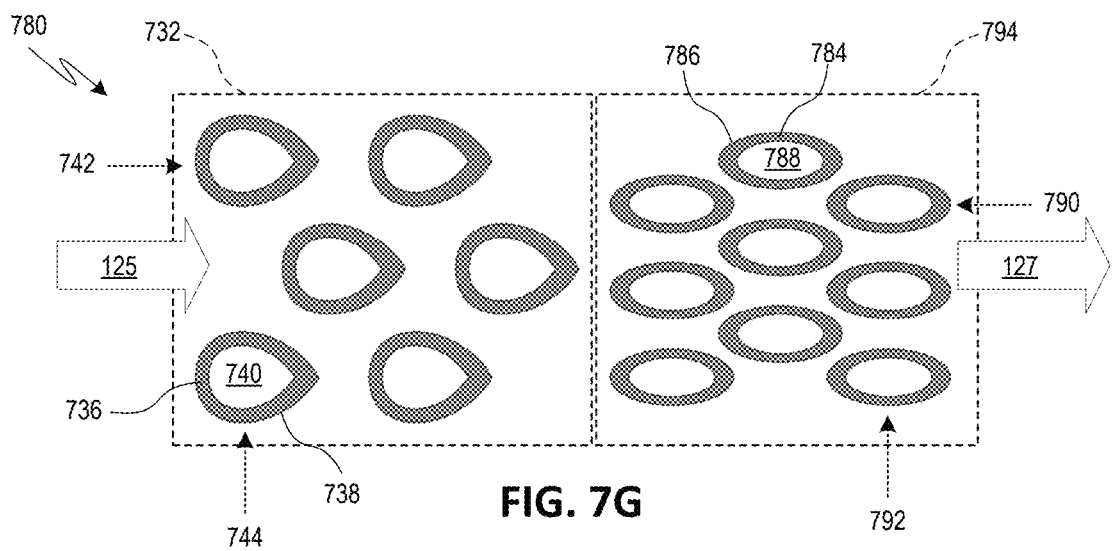

The non-uniform configuration 747 in FIG. 7E includes tubes of the same geometry disposed in different arrangements and with different pitch between sub-arrays, while the non-uniform configuration 750 in FIG. 7F includes tubes of different geometry disposed in the same arrangement and with the same pitch between sub-arrays. However, embodiments are not limited to these specific configurations. Rather, non-uniform configurations can include any combination of variations of tube geometry or cross-sectional shape, tube size, tube pitch, and tube arrangement. For example, FIG. 7G illustrates another non-uniform configuration 780 employing both different tube geometries and different tube pitch. In the illustrated example, a first sub-array 732 has a staggered arrangement of first heat-transfer tubes 736, and a second sub-array 794 has a staggered arrangement of second heat-transfer tubes 784. Within first sub-array 732, each tube 736 can have the same first geometry (e.g., with respect to outer surface 738 and inner conduit 740 shapes). Similarly, within second sub-array 794, each tube 784 can have the same second geometry (e.g., with respect to outer surface 786 and inner conduit 788 shapes). Between the different sub-arrays, however, the tube geometry is different. Moreover, the pitch between arrays is different, for example, such that rows 790 of the second sub-array 794 do not necessarily align with respective rows 742 of the of the first sub-array 732. Alternatively or additionally, spacing between adjacent columns 744 in the first sub-array 732 can be different than the spacing between adjacent columns 792 in the second sub-array 794.

In non-uniform configuration 780, the first and second sub-arrays are arranged sequentially with respect to the crossing fluid flow, with the first sub-array 732 being at a leading end (e.g., proximal inlet flow 125) and the second sub-array 794 being at a trailing end (e.g., proximal outlet flow 127). For example, such a configuration may be especially useful for heat pump applications under frosting conditions. In particular, since the tubes 736 in the leading sub-array 732 have larger sizes and are arranged at a greater pitch, the potential for frost accumulation within sub-array 732 is higher, thereby helping to remove moisture from an incoming air flow 125. Meanwhile, the trailing sub-array 794 employs tubes 784 having smaller sizes and are more densely packed, which can facilitate air-side heat transfer performance.

In the above discussed examples, the heat-transfer tubes within a particular array or sub-array are disposed in staggered or inline arrangements, with lateral axes aligned with a row direction of the arrangement and vertical axes aligned with a column direction of the arrangement. The direction of crossing fluid flow can be substantially parallel to either the column direction or the row direction of the arrangement. However, in some embodiments, heat-transfer tubes within an array or sub-array can be rotated about their respective longitudinal axis, such that the lateral and vertical axes thereof are at non-zero, non-orthogonal angle with respect to the row-column directions.

Figure 8:
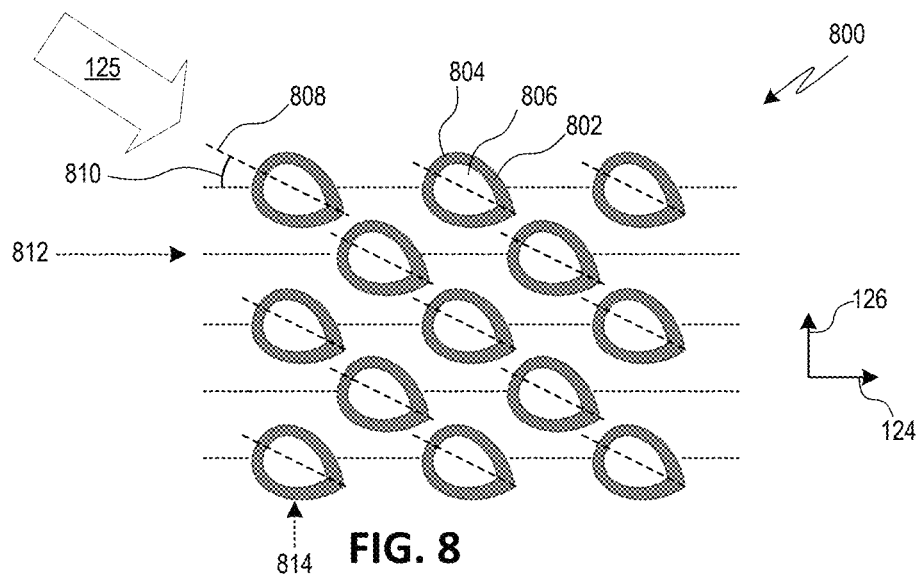
FIG. 8 is a simplified cross-sectional views of another exemplary configuration of a heat-transfer tube array for a heat exchanger, according to one or more embodiments of the disclosed subject matter.

For example, FIG. 8 illustrates an array 800 of heat-transfer tubes 802 in an angled configuration. The heat-transfer tubes 802 in the array 800 are disposed in a staggered arrangement, with tubes 802 in each row 812 or column 814 being aligned with other tubes in the respective row 812 or column 814 (e.g., a geometric center of the tubes being disposed on a common line) but tubes 802 in adjacent rows or columns being offset from each other. Each heat-transfer tube 802 has an outer surface 804 and an inner conduit 806. The cross-sectional shape of the outer surface 804 or the inner conduit 806 can have an axis of reflectional symmetry 808. In the illustrated embodiment, each tube 802 has been rotated about its longitudinal axis such that its axis of symmetry 808 is at angle 810 with respect to the direction of row 812. In some embodiments, the rotation may align the tube axes of symmetry 808 with a direction of crossing fluid flow 125, as shown in FIG. 8.

Such angled configurations may be especially useful in heat exchanger systems that experience non-uniform flow of the crossing fluid. For example, in typical residential AC systems, an "A" shape configuration (A-type) is used to deliver required heat loads with minimal duct dimensions in order to reduce overall system footprint. Due to this A-type configuration as well as uneven fan airflow, the heat exchanger in such systems rarely experiences uniform airflow across its faces, which can reduce thermal performance of the heat exchanger. The angled configuration illustrated in FIG. 8 can help reduce the impact of the non-uniform airflow.

Spacer Examples

As noted above, spacers are provided within the array of heat-transfer tubes in order to be able to assemble multiple tubes (e.g., tens, hundreds, or even thousands of tubes) to the manifolds while maintaining desired spacing between tubes. Moreover, during operation of the heat exchanger, the spacers can help buttress the heat-transfer tubes against the internal pressure (e.g., 3-6 MPa) generated by fluid flowing therethrough. In some embodiments, the spacers can also offer additional functionality, such as condensation management or fluid dynamic features to enhance heat exchange.

Figure 9A:
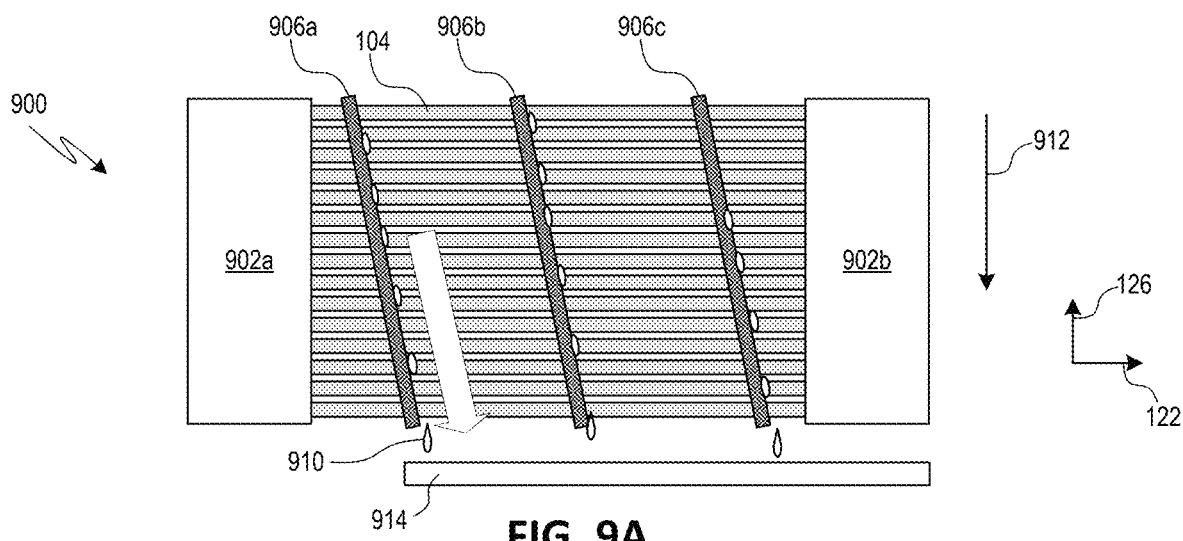
FIGS. 9A-9B are simplified schematic diagrams of exemplary cross-flow heat exchangers employing angled spacers for condensation or runoff collection, according to one or more embodiments of the disclosed subject matter.

FIG. 9A illustrates an exemplary CFHX system 900 employing a plurality of spacers in an angled configuration for condensation or runoff management, for example, in dehumidification (e.g., wet-coil) operating conditions. Similar to system 100 in FIG. 1A, CFHX system 900 has a pair of manifolds 902a, 902b that directs an inlet flow to and collects an outlet flow from heat-transfer tubes 104 fluidically coupled therebetween. A set of spacers 906a-906c support the tubes 104 between the manifolds 902a, 902b. However, instead of being orthogonal to the direction of extension of the tubes 104 (e.g., first direction 122) as in in FIG. 1A, spacers 906a-906c are rotated to have an angle. In particular, the spacers 906a-906c can be at a non-zero angle with respect to a direction of gravity 912.

During operation of CFHX system 900, humidity within the crossing fluid flow may condense on the heat-transfer tubes and collect on spacers 906a-906c. Gravity 912 causes the condensation 910 to move along the angled spacers 906a-906c to a collection basis 914 (or a discharge conduit or drain). The angled spacers 906a-906c thus help remove condensation that may have otherwise impaired heat exchange (e.g., by preventing airside pressure drops from increasing beyond allowable limits and/or removing liquid that could otherwise form frost on the tube surfaces). Alternatively or additionally, rather than the illustrated orthogonal orientation, heat-transfer tubes 104 can also be angled with respect to gravity 912, for example, to further direct condensation to spacers 906a-906c or collection basin 914.

Figure 9B:
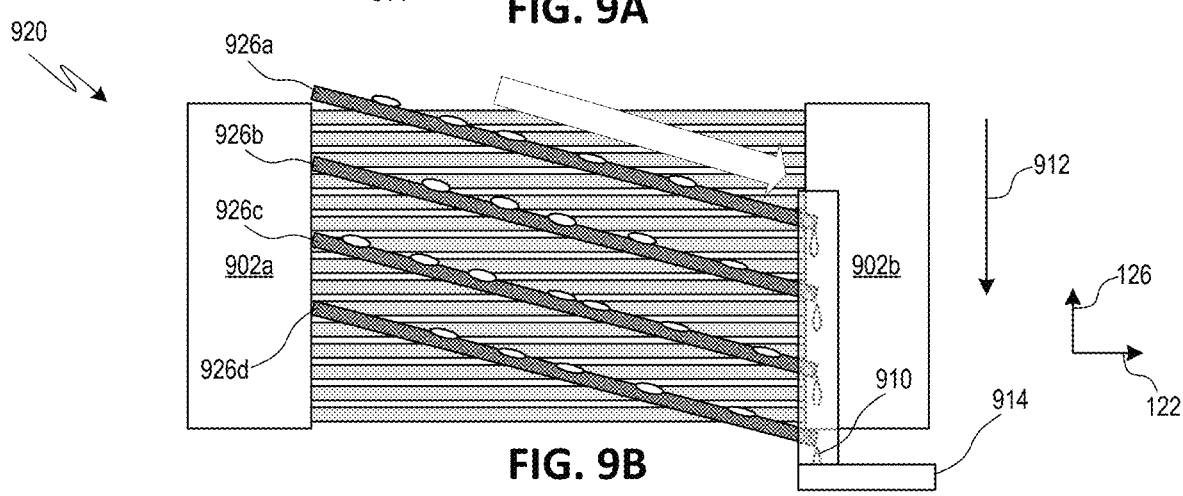

Other configurations for the spacers to provide condensation management are also possible. For example, FIG. 9B illustrates another CFHX system 920 employing a plurality of spacers 926a-926d in an angled configuration. However, in contrast to the setup in FIG. 9A where each heat-transfer tube 104 passes through each spacer 906a-906c, only a subset of the heat-transfer tubes pass through each spacer 926a-926d in FIG. 9B. Operation of spacers 926a-926d to convey condensation to a collection basin 914 is otherwise substantially similar to that described above.

FIGS. 10A-10C illustrate an exemplary spacer 1000 employing fluid dynamic features to enhance heat exchange. Similar to spacer 106 in FIG. 1C, spacer 1000 has a plurality of openings 128, with each opening corresponding to a respective on of the heat-transfer tubes that will pass therethrough. However, spacer 1000 can further include multiple flow-enhancing protrusions 1002 that extend from a main surface 1004 (e.g., a surface through which the openings 128 extend) of the spacer. In the illustrated example of FIGS. 10B-10C, the flow-enhancing protrusions 1002 are constructed as winglets, e.g., a substantially triangular cross-sectional shape with an angled surface 1006 facing inlet fluid flow 125 (e.g., at a non-zero angle with respect to a direction of the flow 125). The disposition of the flow-enhancing protrusions 1002 on the spacer 1000 can generate vortices within the crossing fluid flow, which can reduce flow separation and/or induce turbulence within the boundary layer to improve heat transfer performance.

Other shapes for the flow-enhancing protrusions 1002 are also possible according to one or more contemplated embodiments. In some embodiments, the protrusions 1002 can be arranged on the surface 1004 of the spacer 1000 in a manner similar to that of the openings 128 and/or heat-transfer tubes, for example, to have a staggered or inline arrangement with pitches identical to that of the heat-transfer tube array. Alternatively, the arrangement of the protrusions 1002 can be different than that of either the openings 128 or heat-transfer tubes, for example, to be randomly arranged across the surface of the spacer 1000. The protrusions 1002 can be arranged on just one surface 1004 of the spacer 1000, or on both opposite surfaces of the spacer 1000.

In some embodiments, instead of respective openings for each heat-transfer tube, spacers can be provided with slots for supporting multiple heat-transfer tubes therein, for example, by having a comb-style geometry. To secure the heat-transfer tubes in a desired two-dimensional arrangement, multiple such spacers can be employed to delineate the tubes within the slots into separate rows and columns. Such configurations for the spacers can make assembly of the array of heat-transfer tubes simpler, for example, by allowing tubes to be simply dropped into place within respective slots rather than having to insert each tube through respective holes in the spacers.

For example, FIG. 11A shows a first comb-style spacer 1102 having first and second slots 1104, 1106 (also referred to as recesses) extending in a height direction (e.g., parallel to third direction 126). The first and second slots 1104, 1106 can be spaced from each along a width direction (e.g., parallel to the second direction 124) in an alternating arrangement. A first row of heat-transfer tubes can be inserted into respective first slots 1104 by simply sliding along the height direction from the open end of slots 1104 to the closed end. To delineate the first row of heat-transfer tubes and allow assembly of additional rows, a second comb-style spacer 1112*a* with a slot 1114 extending in a width direction (e.g., parallel to the second direction 124) is provided as shown in FIG. 11B. The combination of first slots 1106 and slot 1114 captures the first row of heat-transfer tubes and allows a second row of heat-transfer tubes 104 to be introduced, for example, by sliding into second slots 1106 along the height direction from the open end of slots 1106 to a top surface now provided by second spacer 1112*a*. The process can repeat with additional second spacers 1112*b*-1112*d* provided for each row, with tubes for odd number rows being inserted into first slots 1104 and tubes for even number rows being inserted into second slots 1106. Thus an array of heat-transfer tubes in a staggered arrangement can be assembled, as shown in FIG. 11C. A similar approach can be employed to achieve an inline arrangement, for example, by disposing tubes for each row within each of the first and second slots 1104, 1106 rather than skipping first slots or second slots for a particular row.

System Assembly Examples

Figure 12:
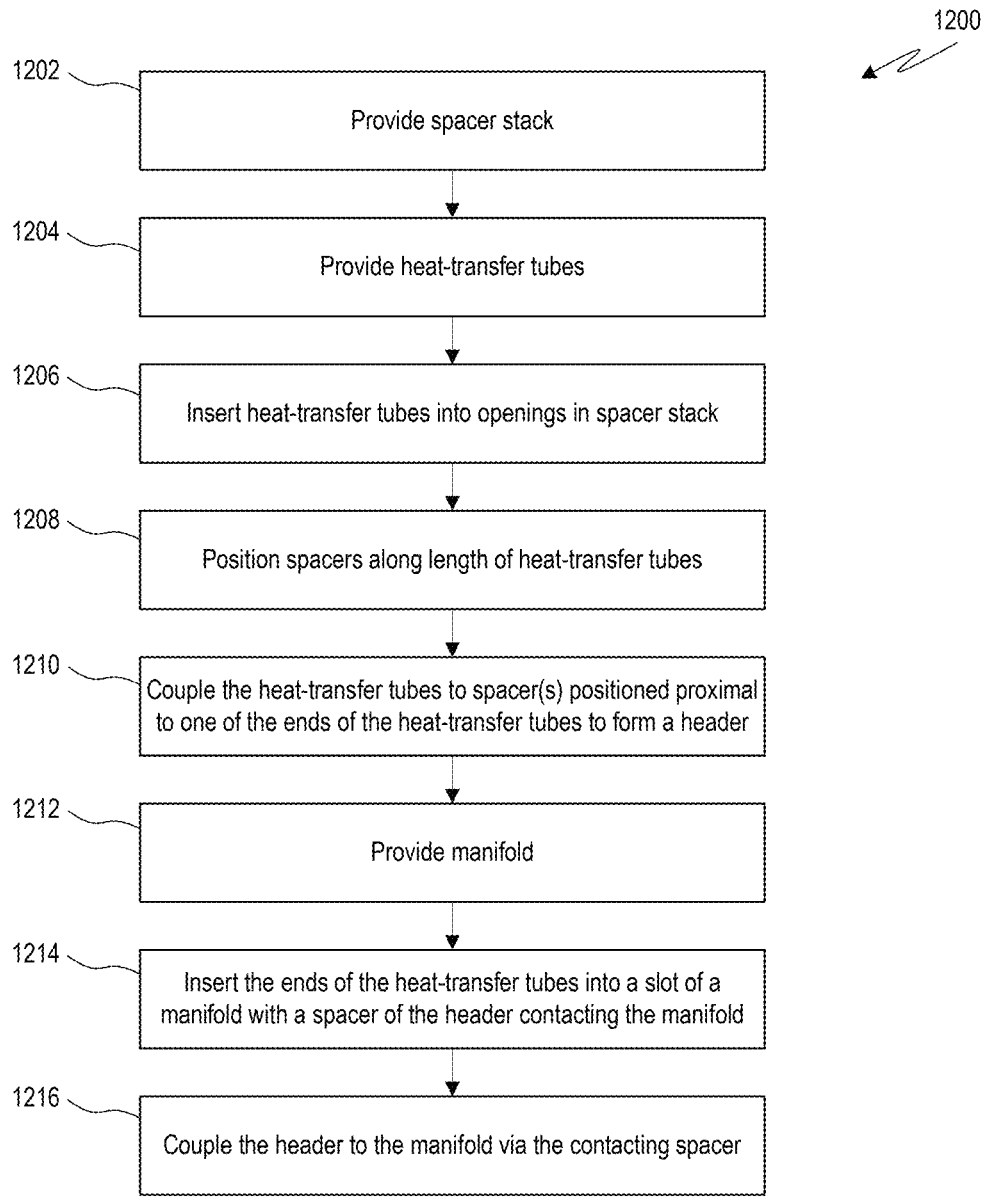
FIG. 12 is a process flow diagram of a first exemplary method for fabricating a heat exchanger, according to one or more embodiments of the disclosed subject matter.

FIG. 12 shows an exemplary method 1200 for fabrication of a CFHX system having a plurality of heat-transfer tubes coupled to one or more manifold portions. The method 1200 can initiate at process block 1202, where a stack of spacers is provided. In some embodiments, the spacers have the configuration illustrated in FIG. 1C or FIGS. 10A-10C. The spacers can be disposed together in contact with each other, with respective openings for the heat-transfer tubes aligned. The stack can include all spacers to be used with a particular array of heat-transfer tubes, for example, where a single stack of six spacers is used at one end of the array to provide a total of six spacers for the array. Alternatively, in some embodiments, the stack includes only a portion of the total spacers required for the array of heat-transfer tubes, for example, where two stacks of three spacers are used at each end of the array to provide a total of six spacers for the array. Other numbers of total spacers in the array and spacers within each stack are also possible according to one or more contemplated embodiments; however, the stack generally includes at least two spacers.

In some embodiments, the provision of process block 1202 can include fabricating each spacer, for example, by a high-accuracy machining method. For example, the spacers with openings for the heat-transfer tubes can be formed by etching (e.g., chemical etching of a metal, such as copper or aluminum), additive manufacturing (e.g., 3-D printing of a metal, polymer, or combination thereof), laser machining, electrical discharge machining, or any other manufacturing method capable of achieving tight tolerances (e.g., less than 0.05 mm, for example, 0.013 mm) for the heat-transfer tube openings therein. In some embodiments, each spacer has a thickness (e.g., through which the heat-transfer tube openings extend) less than 1 mm, for example, 0.3 mm.

The method 1200 can proceed to process block 1204, where a plurality of heat-transfer tubes for the array are provided. Each heat-transfer tube can have an outer surface with a non-circular shape in cross-sectional view. The number of heat-transfer tubes provided can be identical to the number of openings in the spacers, with each heat-transfer tube corresponding to a respective one of the openings in each spacer of the stack. The shape of the openings in the spacers can be similar to the cross-sectional shape of the respective tube but have a size slightly larger (e.g., 1-10% in cross-sectional area) to allow the tube to pass therethrough. In some embodiments, the provision of process block 1204 can include fabrication of the heat-transfer tubes, for example, to have the shapes and/or configurations described elsewhere herein (e.g., with respect to FIGS. 1A and 3A-8).

Figure 13A:
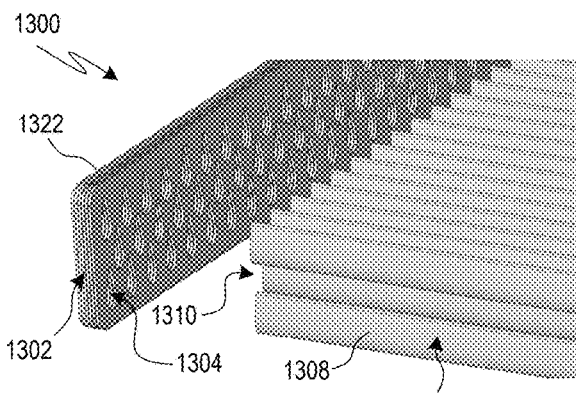
FIGS. 13A-13D are perspective views illustrating aspects of the first method, according to one or more embodiments of the disclosed subject matter.
Figure 13B:
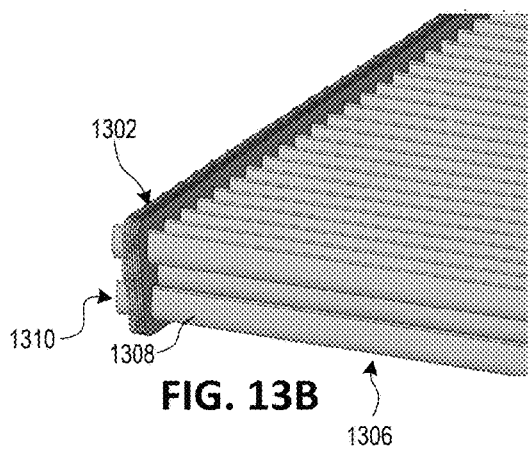

The method 1200 can proceed to process block 1206, where a first end of each heat-transfer tube of the array is inserted into its corresponding openings in the spacer stack. In some embodiments, the first ends of all of the heat-transfer tubes of the array, or the first ends of a subset comprising multiple heat-transfer tubes of the array, are simultaneously inserted into corresponding openings of the spacer stack (e.g., parallel insertion). For example, FIG. 13A shows a setup 1300 for parallel insertion of open first ends 1310 of heat-transfer tubes 1308 of array 1306 into spacer stack 1302 (comprised of six individual spacers 1322*a*-1322*f*). The array 1306 is positioned such that first ends 1310 are aligned with their corresponding openings 1304 in the spacer stack 1302, and the array 1306 is then moved in a direction parallel to the longitudinal direction of the tubes 1308 until the first ends 1310 protrude from an opposite side of the stack 1302, as shown in FIG. 13B. Alternatively, in some embodiments, the first ends of the heat-transfer tubes may be inserted into the corresponding openings one at a time (e.g., sequential insertion) to achieve the same configuration illustrated in FIG. 13B.

Figure 13C:
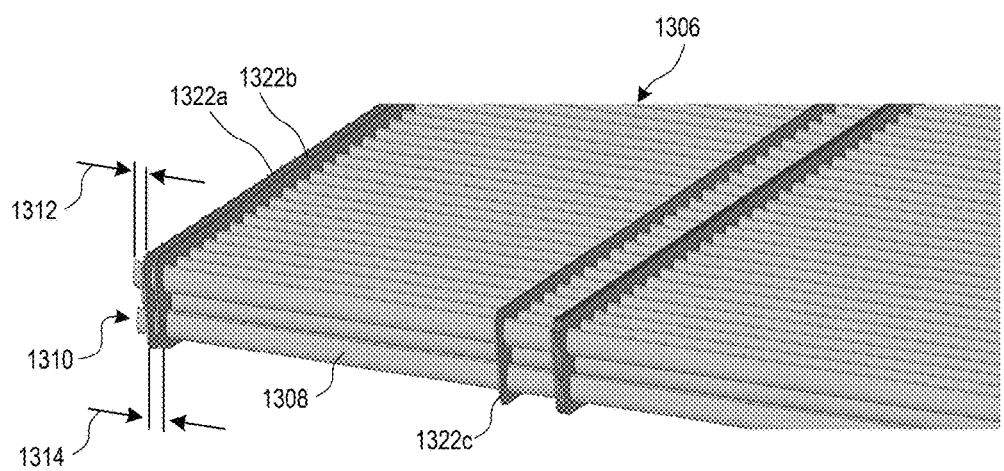

Returning to FIG. 12, the method 1200 can proceed to process block 1208, where one or more of the spacers is positioned along a length of the heat-transfer tubes within the array. At least two of the spacers 1322*a*, 1322*b* from the stack 1302 can be disposed proximal to the first ends 1310 of the heat-transfer tubes 1308, as shown in FIG. 13C. The remaining spacers of the stack 1302, for example, spacer 1322*c*, can be positioned at a location elsewhere within array 1306, for example, to ensure alignment of the tubes 1308. The two spacers 1322*a*, 1322*b* proximal to the first ends 1310 can be separated from each other by a gap 1314 (e.g., about 0.1-1 mm, inclusive). The first ends 1310 can have a length 1312 (e.g., about 0.1-2 mm, inclusive) extending beyond the closest spacer 1322*a*.

Returning to FIG. 12, the method 1200 can proceed to process block 1210, where the one or more spacers proximal to the first ends are coupled to the heat-transfer tubes to form a header. For example, the gap between the pair of spacers proximal to the first ends can be filled or sealed with material 1326 (see FIG. 13E), thereby forming a header that retains the heat-transfer tubes therein. In some embodiments, the gap between spacers (e.g., spacers 1322a, 1322b in FIG. 13C) is sealed or filled by soldering (e.g., Stay Brite SB11 lead-free solder in combination with Stay-Clean paste flux, both sold by Harris Products Group), brazing, welding, or any combination thereof. Alternatively or additionally, the gap can be sealed or filled with an adhesive (e.g., Scotch-Weld Epoxy Adhesive DP190, Scotch-Weld Acrylic Adhesive DP810, or Scotch-Weld Epoxy Adhesive 2216, sold by 3M, or Loctite 3981, sold by Henkel Corporation).

The method 1200 can proceed to process block 1212, where an appropriate manifold is provided. The manifold can have one or more ports (e.g., inlet, outlet, or both) and an inner volume for directing fluid flow to/from the one or more ports. The manifold may optionally include separator walls and/or baffles within the internal volume, for example, to redirect fluid flow through the heat-transfer tube array. In addition, the manifold can have a slot sized to receive the tube ends exposed from the header. In some embodiments, the provision of process block 1212 can include fabricating the manifold, for example, by forming the slot within a sidewall of the manifold by machining or by forming the manifold with the slot already therein (e.g., via casting or molding).

Figure 13D:
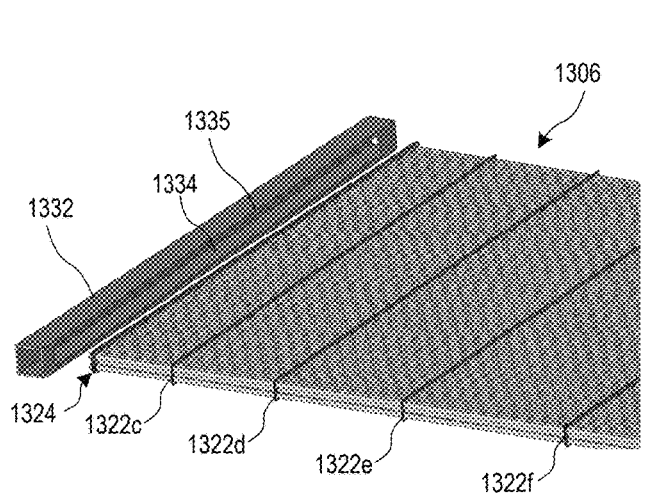

The method 1200 can proceed to process block 1214, where the first ends of each heat-transfer tube of the array are inserted into the slot of the manifold. For example, as shown in FIG. 13D, the slot 1334 of manifold 1332 is sized to allow the tube ends 1310 to pass through into fluid communication with an internal volume 1336 of manifold 1332. The header 1324 formed by the sealed spacers 1322a, 1332b can contact a facing surface 1335 (e.g., surface of manifold 1332 facing the array 1306) as the tube ends 1310 extend into internal volume 1336 of manifold 1332 via slot 1334.

Figure 13E:
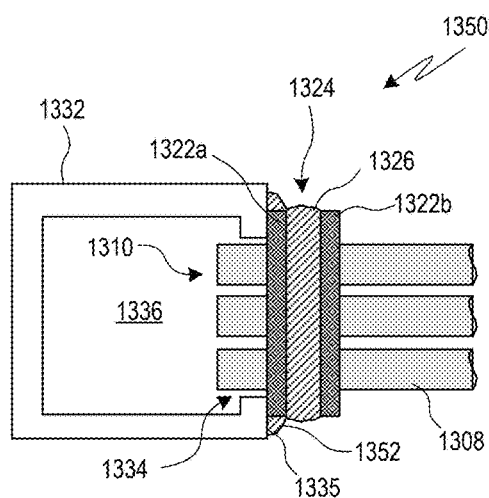
FIG. 13E is a simplified cross-sectional view of a heat-transfer tube array assembled to a manifold using the first method, according to one or more embodiments of the disclosed subject matter.

Returning to FIG. 12, the method 1200 can proceed to process block 1216, where the header is coupled to the manifold via the contacting spacer. For example, the header 1324 can be coupled to portions of the manifold 1332 surrounding the slot 1334 (e.g., portions of facing surface 1335), thereby sealing the tube ends 1310 to the internal volume 1336 of the manifold 1332, as shown in FIG. 13E. For example, the header 1324 can be sealed to the manifold 1332 by a material 1352, such as epoxy or adhesive (e.g., Scotch-Weld Epoxy Potting Compound DP270 or Scotch-Weld Acrylic Adhesive DP810, sold by 3M). Other coupling modalities, such as soldering, welding, or brazing, are also possible according to one or more contemplated embodiments.

Figure 14A:
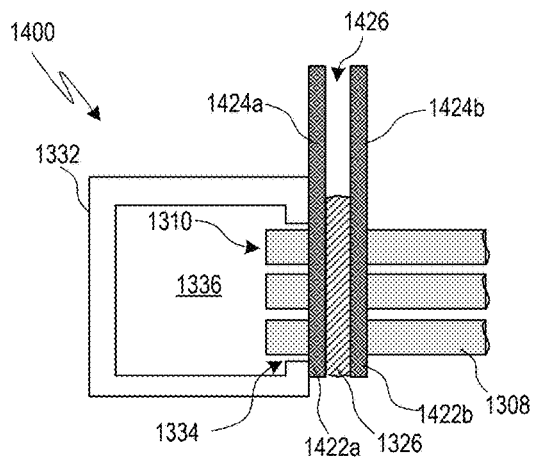
FIGS. 14A and 14C are simplified cross-sectional views illustrating aspects of a variation of the first method for fabricating a heat exchanger, according to one or more embodiments of the disclosed subject matter.
Figure 14B:
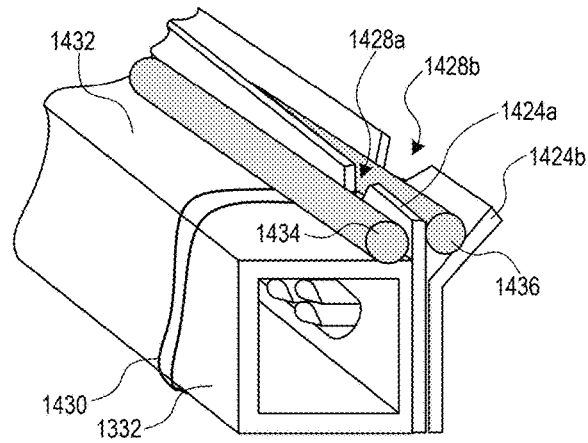
FIG. 14B is a perspective view of the fabrication setup illustrated in FIG. 14C.
Figure 14C:
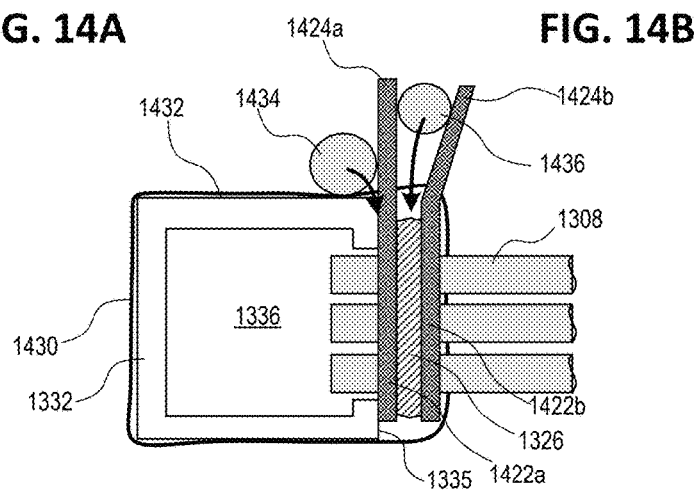

For example, FIGS. 14A-14C illustrate a variation for method 1200 that uses solder to seal the header to the manifold. Whereas each spacer 1322 in stack 1302 in FIGS. 13A-13E has a height that does not extend beyond a profile of the manifold in side view, in the alternative configuration 1400 of FIG. 14A, at least the two spacers 1422a, 1422b proximal to the first ends 1310 have respective tab portions 1424a, 1424b that extend beyond a top surface 1432 of the manifold 1332. After process block 1210 to couple the spacers 1422a, 1422b to the tubes 1308 via gap-filling material 1326, the tap portions 1424a, 1424b can remain separated by an upper gap 1426. Each tab portion 1424a, 1424b can include one or more vertically extending notches 1428a, 1428b. At process block 1214, one or more wires 1430 (e.g., stainless steel wire) can be wrapped around the manifold 1332 and the header, passing through the notches 1428a, 1428b, in order to temporarily couple the two together. Other techniques or options for temporarily holding the manifold and header together are also possible according to one or more contemplated embodiments.

Within gap 1426, a first solder wire 1436 can be disposed between the tab portions 1424a, 1424b, and a second solder wire 1434 can be disposed adjacent to the top surface 1432 of the manifold 1332 and the tab portion 1424a of the spacer 1422a contacting facing surface 1335 of the manifold 1332, as shown in FIGS. 14B-14C. At process block 1216, the entire assembly illustrated in FIGS. 14B-14C can be heated (e.g., in an oven) to cause the solder wires 1434, 1436 to melt and couple the header and manifold together. In particular, the melted solder is drawn between spacers 1422a, 1422b and between spacer 1422a and facing surface 1335 of manifold 1332 by capillary action in order to seal the tubes 1308 to the manifold 1332.

Returning to FIG. 12, after process block 1216, at least process blocks 1208-1216 can be repeated to attach a second manifold (or second portion of a common manifold) to opposite ends of the heat-transfer tubes of the array. Alternatively, the processing to attach the second manifold can occur concurrently with the processing to attach the first manifold. Although not specifically illustrated in FIG. 12, method 1200 can further include additional conventional steps for fabrication and use of heat-exchanger in a particular application, for example, by coupling manifolds to appropriate conduits in order to flow fluid therethrough.

Although process blocks 1202-1216 of method 1200 have been separately illustrated in FIG. 12, in some embodiments, process blocks may be combined and performed together (simultaneously or sequentially). Moreover, although FIG. 12 illustrates a particular order for blocks 1202-1216 of method 1200, embodiments of the disclosed subject matter are not limited thereto. Indeed, in certain embodiments, the blocks may occur in a different order than illustrated or simultaneously with other blocks. Accordingly, embodiments of the disclosed subject matter are not limited to the specific order illustrated in FIG. 12 and described above.

Figure 15A:
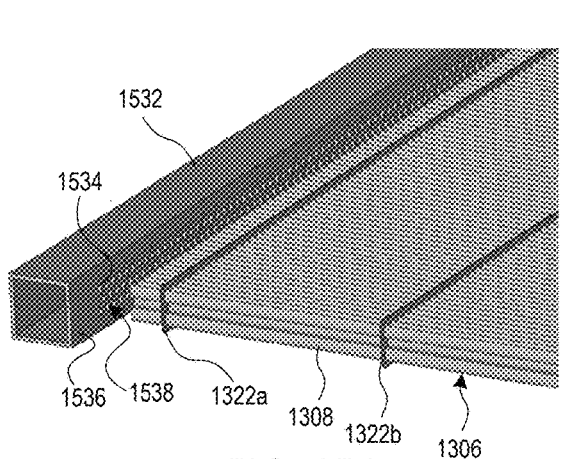
FIGS. 15A-15B are perspective and simplified cross-sectional views, respectively, illustrating aspects of a second exemplary method for fabricating a heat exchanger, according to one or more embodiments of the disclosed subject matter.
Figure 16:
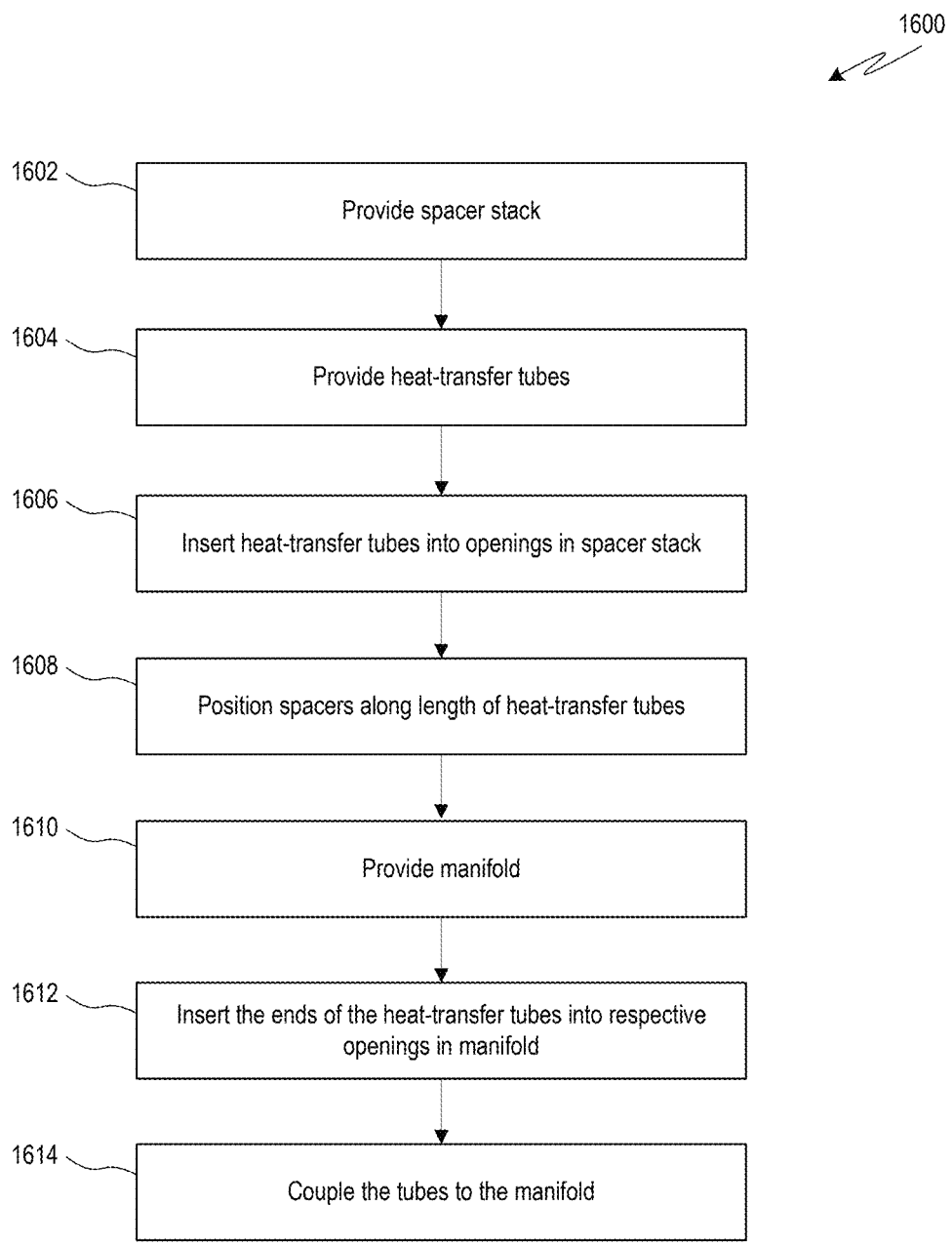
FIG. 16 is a process flow diagram of the second method for fabricating a heat exchanger, according to one or more embodiments of the disclosed subject matter.

FIG. 16 illustrates another exemplary method 1600 for fabrication of a CFHX system having a plurality of heat-transfer tubes coupled to one or more manifold portions. Process blocks 1602-1606 of method 1600 may be substantially similar to process blocks 1202-1206 of method 1200 described above, and such description will not be repeated here. The method 1600 can proceed to process block 1608, where one or more of the spacers is positioned along a length of the heat-transfer tubes within the array. For example, at least one of the spacers 1322a from the stack can be disposed proximal to the first ends 1310 of the heat-transfer tubes 1308, as shown in FIG. 15A. The remaining spacers of the stack 1302, for example, spacer 1322b, can be positioned at location(s) elsewhere within array 1306, for example, to ensure alignment of the tubes 1308.

Returning to FIG. 16, the method 1600 can proceed to process block 1610, where an appropriate manifold is provided. The manifold can have one or more ports (e.g., inlet, outlet, or both) and an inner volume for directing fluid flow to/from the one or more ports. The manifold may optionally include separator walls and/or baffles within the inner volume, for example, to redirect fluid flow through the heat-transfer tube array. In addition, the manifold 1532 has an array 1538 of openings 1534 in a surface 1536 facing the tube array 1306, as illustrated in FIG. 15A. The number of heat-transfer tubes 1308 in the array 1306 can be identical to the number of openings 1534 in the array 1538 of manifold 1532, with each heat-transfer tube corresponding to a respective one of the openings in the manifold. The shape of the openings 1534 can be similar to the cross-sectional shape of the respective tube 1308, but have a size slightly larger (e.g., 1-10% in cross-sectional area) to allow the tube to pass therethrough. In some embodiments, the provision of process block 1610 can include fabricating the manifold, for example, by forming the openings in the sidewall of the manifold by machining or by forming the manifold with the slot already therein (e.g., via casting or molding). For example, openings 1534 can be formed by a precision machining method (e.g., having a tolerance of about 2.54× $10^{-3}$), such as electrical discharge machining (EDM) (e.g., sinker EDM) and/or laser machining.

Figure 15B:
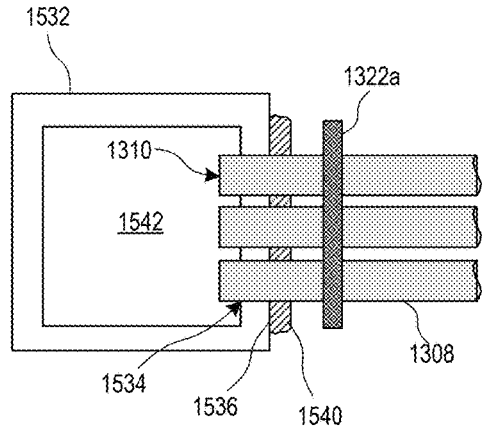

Returning to FIG. 16, the method 1600 can proceed to process block 1612, where a first end of each heat-transfer tube of the array is inserted into its corresponding openings in the manifold. In some embodiments, the first ends of all of the heat-transfer tubes of the array, or the first ends of a subset comprising multiple heat-transfer tubes of the array, are simultaneously inserted into corresponding openings of the spacer stack (e.g., parallel insertion). For example, FIG. 15A shows a setup for parallel insertion of the open first ends 1310 of heat-transfer tubes 1308 of array 1306 into the respective openings 1534 of the manifold 1532. The array 1306 is positioned such that first ends 1310 are aligned with their corresponding openings 1534, and the array 1306 is then moved in a direction parallel to the longitudinal direction of the tubes 1308 until the first ends extend into the internal volume 1542 of the manifold 1532, as shown in FIG. 15B.

Returning to FIG. 16, the method 1600 can proceed to process block 1614, where the tube array is coupled to the manifold via the contacting spacer. For example, the tubes 1308 can be individually or jointly coupled to portions of the manifold 1532 surrounding each respective opening 1534 (e.g., portions of facing surface 1536), thereby sealing the tube ends 1310 to the internal volume 1542 of the manifold 1532, as shown in FIG. 15B. For example, the header 1324 can be sealed to the manifold 1332 by a coupling material 1352, such as epoxy or adhesive (e.g., Scotch-Weld Epoxy Potting Compound DP270, sold by 3M). In some embodiments, the internal volume 1542 of the manifold 1532 can be filled with a removal or sacrificial material in order to prevent the coupling material 13335 from penetrating into the manifold and otherwise obstructing the open first 1310 ends of the heat-transfer tubes.

Other coupling modalities, such as soldering, welding, or brazing, are also possible according to one or more contemplated embodiments. In the illustrated example of FIGS. 15A-15B, proximal spacer 1322a does not come into contact with the manifold 1532; however, in other contemplated embodiments, the proximal spacer 1322a will contact and be coupled to the manifold. For example, the spacers of FIGS. 15A-15B and the method 1600 of FIG. 16 can altered in manner similar to that described above for FIGS. 14A-14C, whereby the melted solder is drawn by capillary action between the facing surface 1536 of the manifold and the contacting proximal spacer 1322a to seal the perimeter of each opening 1534.

Returning to FIG. 16, after process block 1614, at least process blocks 1610-1614 can be repeated to attach a second manifold (or second portion of a common manifold) to opposite ends of the heat-transfer tubes of the array. Alternatively, the processing to attach the second manifold can occur concurrently with the processing to attach the first manifold. Although not specifically illustrated in FIG. 16, method 1600 can further include additional conventional steps for fabrication and use of heat-exchanger in a particular application, for example, by coupling manifolds to appropriate conduits in order to flow fluid therethrough.

Although process blocks 1602-1614 of method 1600 have been separately illustrated in FIG. 16, in some embodiments, process blocks may be combined and performed together (simultaneously or sequentially). Moreover, although FIG. 16 illustrates a particular order for blocks 1602-1614 of method 1600, embodiments of the disclosed subject matter are not limited thereto. Indeed, in certain embodiments, the blocks may occur in a different order than illustrated or simultaneously with other blocks. Accordingly, embodiments of the disclosed subject matter are not limited to the specific order illustrated in FIG. 16 and described above.

Figure 17:
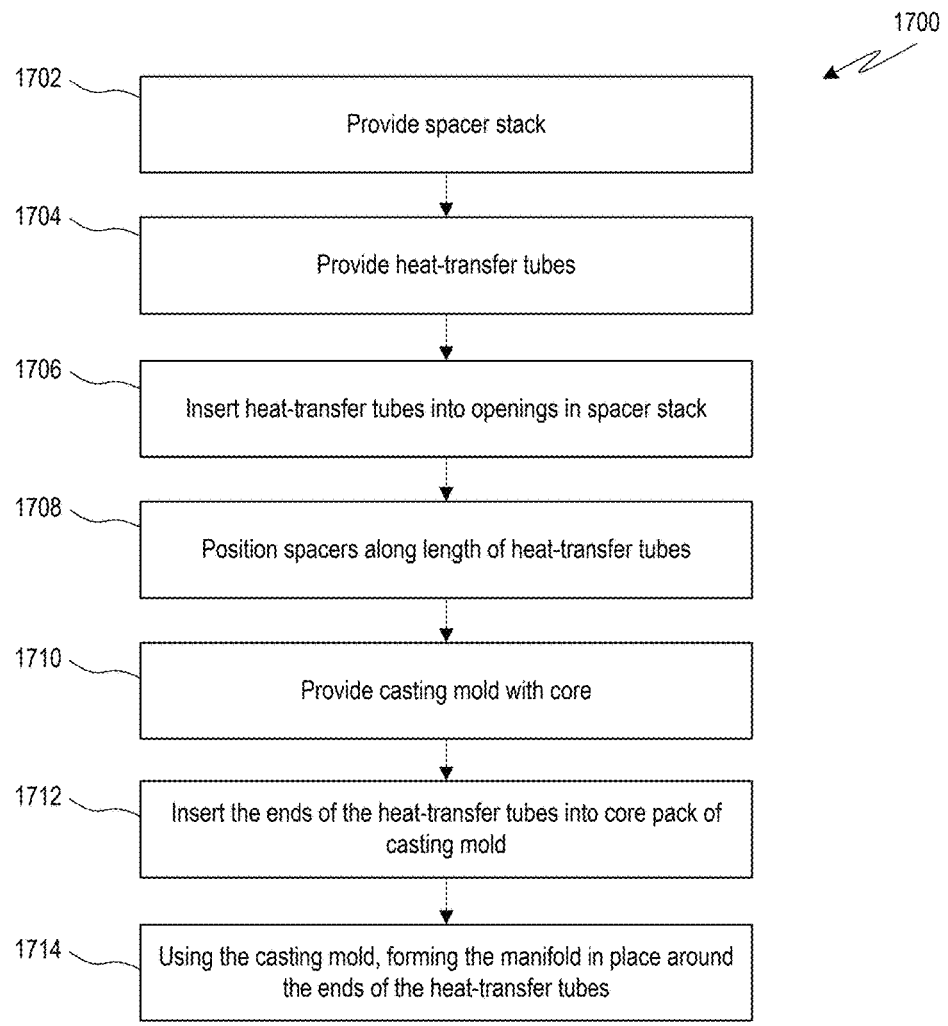
FIG. 17 is a process flow diagram of a third exemplary method for fabricating a heat exchanger, according to one or more embodiments of the disclosed subject matter.
Figures 18A, 18B:
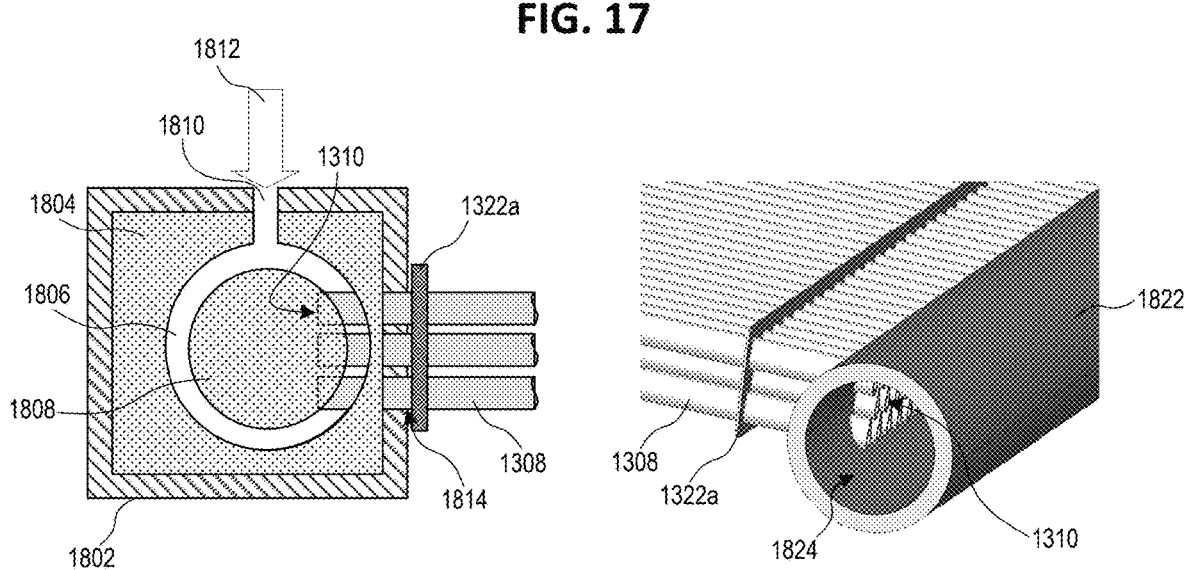
FIGS. 18A-18B are simplified cross-sectional and perspective views, respectively, illustrating aspects of the third method, according to one or more embodiments of the disclosed subject matter.

FIG. 17 illustrates another exemplary method 1700 for fabrication of a CFHX system having a plurality of heat-transfer tubes coupled to one or more manifold portions. Process blocks 1702-1706 of method 1700 may be substantially similar to process blocks 1202-1206 of method 1200 described above, and such description will not be repeated here. The method 1700 can proceed to process block 1708, where one or more of the spacers is positioned along a length of the heat-transfer tubes within the array. For example, at least one of the spacers 1322a from the stack can be disposed proximal to the first ends 1310 of the heat-transfer tubes 1308, as shown in FIG. 18A. The remaining spacers of the stack 1302 can be positioned at location(s) elsewhere within array 1306, for example, to ensure alignment of the tubes 1308. Alternatively, in some embodiments, all of the spacers may be positioned remote from the first ends 1310. In some embodiments, one, some, or all of spacers can be coupled to the heat-transfer tubes (e.g., via soldering, brazing, welding, or any other coupling modality) to create a tube pack that can be more readily handled for subsequent in situ casting of the manifold.

Returning to FIG. 17, the method 1700 can proceed to process block 1710, where a casting mold with core is provided. The mold (e.g., core box) can be used for sand casting or precision mold casting of the manifold of the heat exchanger. For example, the casting mold 1802 can hold a sand mold 1804 with a recess 1806 defining external surfaces of the desired manifold, while a core pack 1808 supported within recess 1806 defines internal surfaces (e.g., the internal volume through which fluid will flow) of the manifold.

Returning to FIG. 17, the method 1700 can proceed to process block 1712, where first ends of the heat-transfer tubes are inserted into the casting mold. In particular, the first ends 1310 can be inserted through one or more openings 1814 into the casting mold 1802 to reach the core pack 1808, as illustrated in FIG. 18A. Alternatively, in some embodiments, opening 1814 can be eliminated in favor of disposing the entire tube assembly within casting mold 1802, but otherwise protecting the tubes of the array from molten material used for the casting, for example, by sand mold 1804. In some embodiments, at least one of the spacers can be disposed within the casting mold. For example spacer 1322a can be disposed within recess 1806.

The method 1700 can then proceed to process block 1714, where the manifold is formed in place around the first ends of the heat-transfer tubes. For example, a supply 1812 of molten material can be provided to inlet or runner 1810 to fill the recess 1806 between sand mold 1804 and the core pack 1808 with molten material, as illustrated in FIG. 18A. For example, the molten material can be aluminum, copper, or alloys thereof. In general, however, the molten material is selected to have a melting temperature less than the material that forms heat-transfer tubes. Once the molten material is allowed to cool in process block 1714, the assembly can be removed from the mold 1802 (e.g., by expanding the mold 182 and removing sand or other mold material) to yield a manifold 1822 cast-in-place about the first ends 1310 of the tubes 1308. The first ends 1310 of the tubes 1308 are open to and in sealed fluid communication with the internal volume 1824, which was defined by core pack 1808. In some embodiments, at least one of the spacers (e.g., spacer 1322*a*) can be embedded within a wall of the cast-in-place manifold 1822. In some embodiments, process block 1714 can further include machining the cast manifold, for example, to remove any runner or extraneous pieces.

In the illustrated example of FIGS. 18A-18B, the manifold has a circular cross-sectional dimension. However, other manifold shapes, including complex or non-standard geometries (e.g., FIG. 7D) are also possible according to one or more contemplated embodiments. Moreover, in some embodiments, the casting can allow simultaneous creation of other heat exchanger components or manifold features, such as, but not limited to, end caps for the manifold, fittings, baffles, etc.

Returning to FIG. 17, after process block 1714, at least process blocks 1710-1714 can be repeated to form a second manifold (or second portion of a common manifold) in place over opposite ends of the heat-transfer tubes of the array. Alternatively, the processing to form the second manifold can occur concurrently with the processing to form the first manifold. Although not specifically illustrated in FIG. 17, method 1700 can further include additional conventional steps for fabrication and use of heat-exchanger in a particular application, for example, by coupling manifolds to appropriate conduits in order to flow fluid therethrough.

Although process blocks 1702-1714 of method 1700 have been separately illustrated in FIG. 17, in some embodiments, process blocks may be combined and performed together (simultaneously or sequentially). Moreover, although FIG. 17 illustrates a particular order for blocks 1702-1714 of method 1700, embodiments of the disclosed subject matter are not limited thereto. Indeed, in certain embodiments, the blocks may occur in a different order than illustrated or simultaneously with other blocks. Accordingly, embodiments of the disclosed subject matter are not limited to the specific order illustrated in FIG. 17 and described above.

Figure 19:
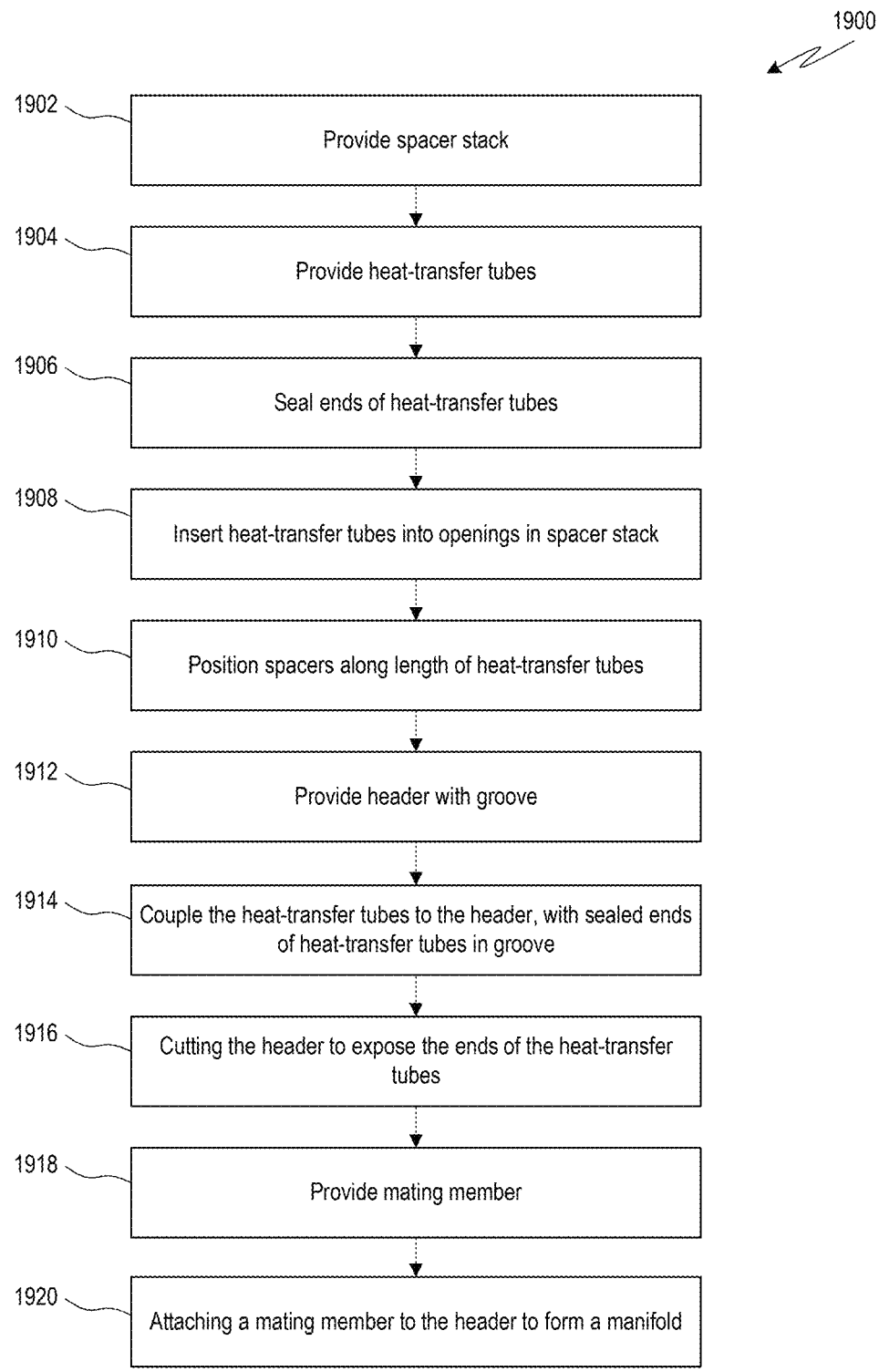
FIG. 19 is a process flow diagram of a fourth exemplary method for fabricating a heat exchanger, according to one or more embodiments of the disclosed subject matter.

FIG. 19 illustrates another exemplary method 1900 for fabrication of a CFHX system having a plurality of heat-transfer tubes coupled to one or more manifold portions. Process blocks 1902-1904 of method 1900 may be substantially similar to process blocks 1202-1204 of method 1200 described above, and such description will not be repeated here. The method 1900 can proceed to process block 1906, where the ends of the heat-transfer tubes within the array are sealed, for example, by crimping, welding (e.g., ultrasonic), flattening, or plugging with another material. The sealing can be effective to prevent material from invading the main body of the tubes during later fabrication and obstructing fluid flow after fabrication is complete.

The method 1900 can proceed to process block 1908, which may be substantially similar to process block 1206 of method 1200 described above. However, if the sealing of process block 1906 causes a variation in the cross-sectional shape of the ends of the heat-transfer tubes, the openings in the spacers through which the tube ends are inserted may be sized and/or shaped to accommodate the variation. The method 1900 can proceed to process block 1910, which may be substantially similar to process block 1608 of method 1600 described above, and such description will not be repeated here.

Figure 20A:
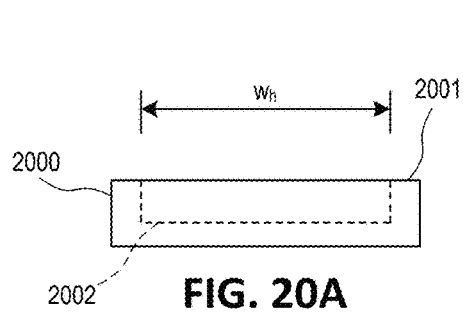
FIGS. 20A-20B are side and perspective views, respectively, of an exemplary header for use in the fourth method, according to one or more embodiments of the disclosed subject matter.
Figure 20B:
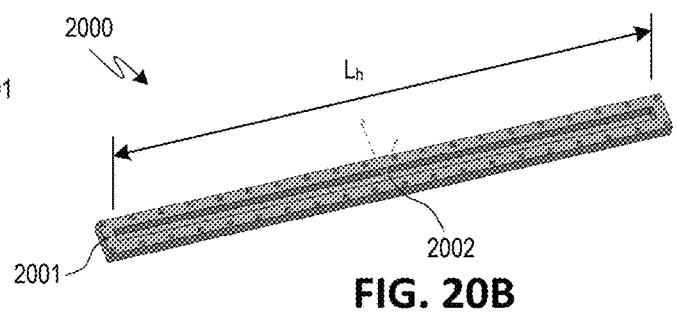

The method 1900 can proceed to process block 1912, where an appropriate header is provided. The header can have a groove that is sized and shaped to match a corresponding size and shape of the sealed first ends of the heat-transfer tube array. For example, FIGS. 20A-20B illustrate an exemplary header 2000 having a groove 2002 of width, $W_h$, and length, $L_h$. The size ($W_h$, $L_h$) of the groove 2002 can be chosen such that the sealed ends of the heat-transfer tube array fit completely therein. Alternatively or additionally, the shape and size of the groove 2002 is selected to match the shape and size of the proximal spacer 1322*a*, for example, to have a clearance fit or transition fit. In some embodiments, a coupling region 2001 of the header 2000 surrounding the groove 2002 can be provided with one or more features, such as threaded or un-threaded through-hole, or threaded blind holes, for subsequent coupling of the header to other structures to form a manifold.

Figure 20C:
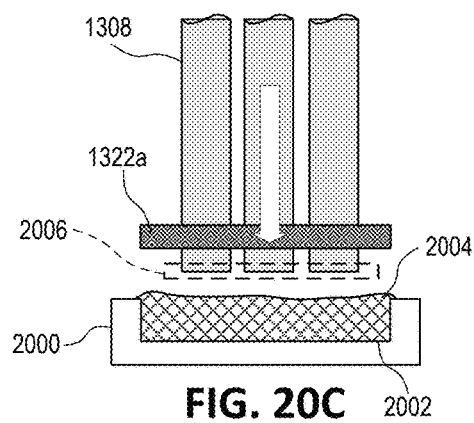
FIGS. 20C-20F and 20H are simplified cross-sectional views illustrating aspects of the fourth method, according to one or more embodiments of the disclosed subject matter.
Figure 20D:
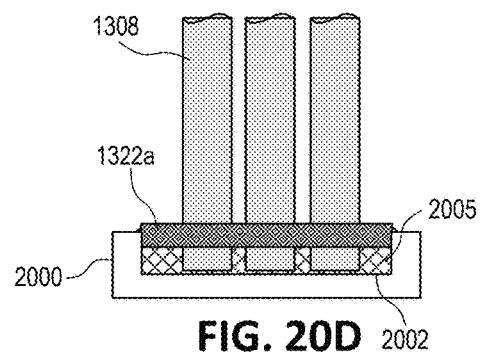

Returning to FIG. 19, the method 1900 can proceed to process block 1914, where the heat-transfer tubes are coupled to the header. The coupling of process block 1914 is such that the sealed ends of the heat-transfer tube become embedded within the header, in particular, by a material filling the groove into which the heat-transfer tube ends are insert. For example, groove 2002 can be filled with material 2004 and the sealed ends 2006 of tubes can be positioned above the groove 2002, as shown in FIG. 20C. The sealed ends 2006 can then be inserted into material 2004. In some embodiments, the material 2004 comprises a molten material, such as a molten metal. In such embodiments, the header 2000 can be heated in order to maintain the material 2004 in the molten state until the sealed ends 2006 of heat-transfer tubes 1308 can be inserted therein. In some embodiments, the proximal spacer 1322*a* is also inserted into material 2004, which may assist in wetting for distributing the molten material around the individual tools and/or increase header strength around the tubes. Alternatively, in some embodiments, the material 2004 in groove 2002 comprises an adhesive or epoxy. In such embodiments, the sealed ends 2006 of heat-transfer tubes 1308 can be inserted into the adhesive or epoxy while still in an uncured (e.g., substantially fluid) state. After curing or hardening to form solid material 2005 within groove 2002, the sealed ends 2006 become permanently coupled to the header 2000, as shown in FIG. 20D. In alternative embodiments, instead of providing material 2004 in groove first, the sealed ends 2006 can be disposed in groove 2002 and the material 2004 subsequently added around the inserted tubes.

Figure 20E:
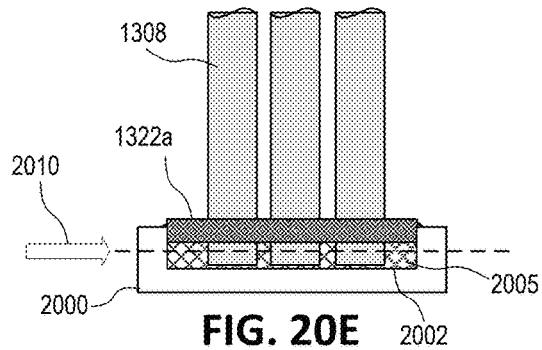
Figure 20F:
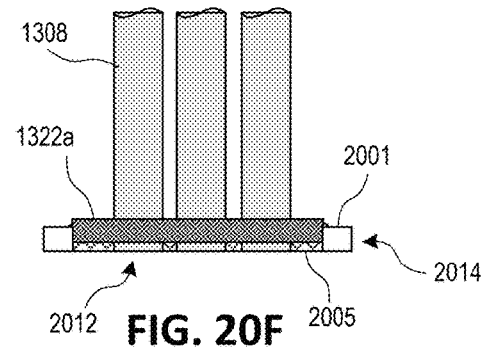
Figure 20G:
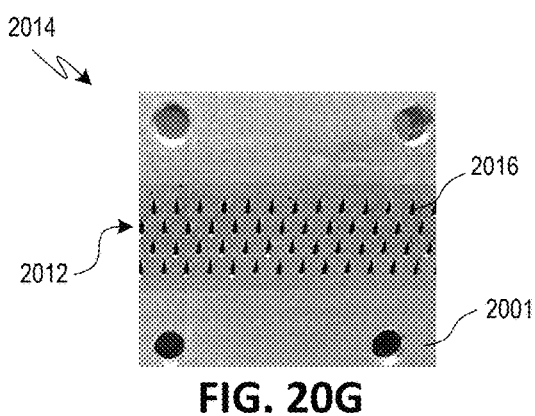
FIG. 20G is a side view of a header with heat-transfer tube array fabricated according to the fourth method.

Returning to FIG. 19, the method 1900 can proceed to process block 1916, where the header is cut. For example, the header 2000 can be cut in a direction 2010 parallel to the groove 2002 and at a location between the sealed ends 2006 of the heat-transfer tubes 1308 and the proximal spacer 1322*a*, as shown in FIG. 20E, such that open ends 2016 of the heat-transfer tubes 1308 are exposed from the cut surface 2102 of the modified header 2014, as shown in FIGS. 20F-20G. In some embodiments, the modified header 2014 includes one of the spacers (e.g., spacer 1322*a*) embedded therein. An integral header and tube array assembly is thus formed. In some embodiments, the cutting can employ machining that does not damage the embedded tube geometry, such as EDM, laser machining, water jet cutting, etc.

Returning to FIG. 19, the method 1900 can proceed to process block 1918, where a mating member is provided. The mating member (e.g., tank) can have a recess that will define an internal fluid volume of the manifold. The mating member may optionally include separator walls and/or baffles within the internal volume, for example, to redirect fluid flow through the heat-transfer tube array. In some embodiments, the provision of process block 1918 can include fabricating the mating member, for example, by forming the recess by machining or by forming the mating member with recess already therein (e.g., via casting or molding).

Figure 20H:
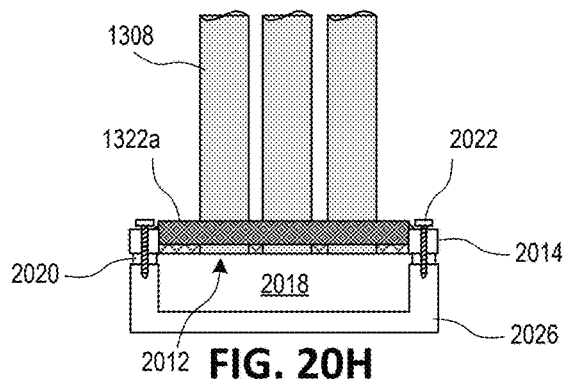

The method 1900 can proceed to process block 1920, where the mating member is coupled to the header to form a manifold. For example, the modified header 2014 can be coupled to portions of the mating member 2026 surrounding recess 2018, with open tube ends exposed from cut surface 2012 facing the recess 2018, as shown in FIG. 20H. In some embodiments, a seal 2020, such as a gasket or O-ring, can be provided between the modified header 2014 and the mating member 2026 to ensure fluid-tight communication between the tubes 1308 and recess 2018 of the manifold. One or more coupling members 2022 (e.g., screws, bolts, or the like) can be used to releasably attach the modified header 2014 to the mating member 2026. Alternatively, in some embodiments, the mating member 2026 can be permanently attached to the header 2014, for example, by soldering, brazing, welding, etc. However, the releasable attachment of the mating member may be desirable in some applications, for example, to allow visual inspection and/or cleaning of heat-transfer tubes, and/or to allow substitution or replacement with a different mating member having different properties (e.g., different baffle designs or locations, different recess sizes, different materials).

Returning to FIG. 19, after process block 1920, at least process blocks 1906-1920 can be repeated to provide a second manifold (or second portion of a common manifold) to opposite ends of the heat-transfer tubes of the array. Alternatively, the processing to provide the second manifold can occur concurrently with the processing to provide the first manifold. Although not specifically illustrated in FIG. 19, method 1900 can further include additional conventional steps for fabrication and use of heat-exchanger in a particular application, for example, by coupling manifolds to appropriate conduits in order to flow fluid therethrough.

Although process blocks 1902-1920 of method 1900 have been separately illustrated in FIG. 19, in some embodiments, process blocks may be combined and performed together (simultaneously or sequentially). Moreover, although FIG. 19 illustrates a particular order for blocks 1902-1920 of method 1900, embodiments of the disclosed subject matter are not limited thereto. Indeed, in certain embodiments, the blocks may occur in a different order than illustrated or simultaneously with other blocks. For example, the sealing of process block 1906 can occur after the ends of the heat-transfer tubes are inserted through the spacer stack in process block 1908. Accordingly, embodiments of the disclosed subject matter are not limited to the specific order illustrated in FIG. 19 and described above.

CONCLUSION

Any of the features illustrated or described with respect to FIGS. 1A-20H can be combined with any other of FIGS. 1A-20H to provide systems, methods, devices, and embodiments not otherwise illustrated or specifically described herein. For example, the heat-transfer tube geometries illustrated in any of FIGS. 4A-6 can be applied to the array configurations in any of FIGS. 7A-7D. In another example, the fabrication methods described with respect to FIGS. 12-20H can be applied to form heat exchangers having the array configurations in any of FIGS. 7A-7D and/or having the heat-transfer tube geometries illustrated in any of FIGS. 4A-6. Other combinations and variations are also possible according to one or more contemplated embodiments. Indeed, all features described herein are independent of one another and, except where structurally impossible, can be used in combination with any other feature described herein.

In view of the many possible embodiments to which the principles of the disclosed technology may be applied, it should be recognized that the illustrated embodiments are only preferred examples and should not be taken as limiting the scope of the disclosed technology. Rather, the scope is defined by the following claims. We therefore claim all that comes within the scope and spirit of these claims.

The invention claimed is:
1. A heat exchanger comprising:
first and second manifold portions;
an array of substantially-parallel first heat-transfer tubes between the first and second manifold portions, each first heat-transfer tube extends along a first direction, a first end of each first heat-transfer tube being in fluid communication with the first manifold portion, a second end of each first heat-transfer tube being in fluid communication with the second manifold portion, each first heat-transfer tube having an outer surface, a first inner surface defining a first conduit, and a second inner surface defining a second conduit; and
one or more spacers disposed along the array of first heat-transfer tubes between the first and second manifold portions, each spacer having a plurality of openings therein, each first heat-transfer tube passing through a corresponding one of the openings in each spacer,
wherein, for each first heat-transfer tube in a cross-sectional view perpendicular to the first direction:
the outer surface forms a first shape that is non-circular, the first shape having a leading bulbous end and a tapered tail end, the first conduit being a closest conduit to the leading bulbous end,
the first shape has reflectional symmetry with respect to a lateral axis extending along a second direction perpendicular to the first direction,
the first inner surface forms a second shape different than the first shape, the second shape having reflectional symmetry with itself with respect to the lateral axis,
the first shape is a droplet shape,
the second inner surface forms a third shape in the cross-sectional view different than the first shape, and
both the second shape and the third shape are circles or ellipses, and
wherein each of the first heat-transfer tubes has only two conduits therein.
2. The heat exchanger of claim 1, wherein:
the first manifold portion is constructed as an inlet for supplying a gas or fluid to the array of first heat-transfer tubes,
the second manifold portion is constructed as an outlet from the array of first heat-transfer tubes, the array of first heat-transfer tubes is constructed to allow a gas or fluid to flow through the array in thermal contact with the outer surfaces of the first heat-transfer tubes, and
the heat exchanger is configured as a cross-flow heat exchanger.

3. The heat exchanger of claim 1, wherein:
a first pair of spacers of the one or more spacers is disposed proximal to the first ends of the first heat-transfer tubes, the spacers of the first pair being spaced from each other along the first direction by a gap filled with a coupling material, the first ends of the first heat-transfer tubes extending into a first receiving slot of the first manifold portion, at least one of the spacers of the first pair being coupled to a first facing surface of the first manifold portion so as to seal a periphery of the first receiving slot, or
a second pair of spacers of the one or more spacers is disposed proximal to the second ends of the first heat-transfer tubes, the spacers of the second pair being spaced from each other along the first direction by another gap filled with the coupling material, the second ends of the first heat-transfer tubes extending into a second receiving slot of the second manifold portion, at least one of the spacers of the second pair being coupled to a second facing surface of the second manifold portion so as to seal a periphery of the second receiving slot,
wherein the coupling material comprises solder, adhesive, brazing filler metal, or welding filler metal.

4. The heat exchanger of claim 1, wherein:
a wall of the first manifold portion has a plurality of openings therein, the first end of each first heat-transfer tube being inserted into a corresponding one of the openings in the wall of the first manifold portion, or
a wall of the second manifold portion has a plurality of openings therein, the second end of each first heat-transfer tube being inserted into a corresponding one of the openings in the wall of the second manifold portion.

5. The heat exchanger of claim 1, wherein:
(a) the first manifold portion comprises a first header and a first mating member having one or more recesses,
a first spacer of the plurality of spacers is disposed proximal to the first ends of the first heat-transfer tubes and coupled to the first header, the first ends of the first heat-transfer tubes being disposed within the first header and opening at a side of the first header opposite the first spacer,
the first mating member is releasably coupled to the first header such that one or more recesses of the first mating member are in fluid communication with one or more of the first ends of the first heat-transfer tubes, and
the side of the first header, which faces and bounds the one or more recesses of the first mating member so as to form the first manifold portion, has the first ends of the first heat-transfer tubes exposed therefrom such that the first ends are in direct fluid communication with the one or more recesses; or
(b) the second manifold portion comprises a second header and a second mating member having one or more recesses,
a second spacer of the plurality of spacers is disposed proximal to the second ends of the first heat-transfer tubes and coupled to the second header, the second ends of the second heat-transfer tubes being disposed within the second header and opening at a side of the second header opposite the second spacer,
the second mating member is releasably coupled to the second header such that one or more recesses of the second mating member are in fluid communication with one or more of the second ends of the first heat-transfer tubes, and
the side of the second header, which faces and bounds the one or more recesses of the second mating member so as to form the second manifold portion, has the second ends of the first heat-transfer tubes exposed therefrom such that the second ends are in direct fluid communication with the one or more recesses.

6. The heat exchanger of claim 1, further comprising:
a second array of substantially-parallel second heat-transfer tubes extending along the first direction between the first and second manifold portions, a first end of each second heat-transfer tube being in fluid communication with the first manifold portion, a second end of each second heat-transfer tube being in fluid communication with the second manifold portion, each second heat-transfer tube having an outer surface and an inner surface defining a third conduit,
wherein, for each second heat-transfer tube in a cross-sectional view perpendicular to the first direction, the outer surface and the inner surface form respective shapes, and
wherein the shape of the outer surface, the shape of the inner surface, an arrangement of heat-transfer tubes, a pitch between heat-transfer tubes, or any combination thereof for the second array is different than that for the first array.

7. The heat exchanger of claim 1, wherein at least one of the one or more spacers includes protrusions that project along the first direction from a surface of the corresponding spacer, each protrusion being disposed spaced from and between the plurality of openings in the corresponding spacer.

8. The heat exchanger of claim 7, wherein each protrusion has a substantially triangular cross-sectional shape and is arranged such that a sloped surface thereof faces an inlet gas or fluid flow external to the array of first heat-transfer tubes.

9. The heat exchanger of claim 1, wherein:
the array has top and bottom ends, the top end being separated from the bottom end along a direction perpendicular to the first direction and parallel to a direction of gravity; and
at least one of the one or more spacers is arranged at a non-orthogonal angle with respect to the first direction, such that a first end of the at least one spacer at the top end of the array is offset along the first direction from a second end of the at least one spacer at the bottom end of the array.

10. The heat exchanger of claim 9, further comprising a basin, conduit, or drain disposed with respect to the second end of the at least one spacer so as to capture condensation therefrom.

11. The heat exchanger of claim 1, further comprising:
a second array of substantially-parallel second heat-transfer tubes extending along the first direction between the first and second manifold portions, a first end of each second heat-transfer tube being in fluid communication with the first manifold portion, a second end of each second heat-transfer tube being in fluid communication with the second manifold portion, each second heat-transfer tube having an outer surface and an inner surface defining a third conduit,
wherein a lateral pitch between the second heat-transfer tubes in the second array along the second direction is different than a lateral pitch between the first heat-transfer tubes in the array along the second direction, or
a vertical pitch between the second heat-transfer tubes in the second array along a third direction perpendicular to the first and second direction is different than a vertical pitch between the first heat-transfer tubes in the array along the third direction.

12. The heat exchanger of claim 1, wherein:
a ratio of lateral pitch between the first heat-transfer tubes in the array along the second direction to a height of each first heat-transfer tube in the array along a third direction perpendicular to the first and second direction is in a range of 0.75 to 3.0;
a ratio of vertical pitch between the first heat-transfer tubes in the array along the third direction to the height of each first heat-transfer tube in the array along the third direction is in a range of 2.0 to 3.0; and
the height of each first heat-transfer tube in the array along the third direction is in a range of 0.5 mm to 3.0 mm.

13. A heat exchanger comprising:
first and second manifold portions;
an array of substantially-parallel first heat-transfer tubes between the first and second manifold portions, each first heat-transfer tube extends along a first direction, a first end of each first heat-transfer tube being in fluid communication with the first manifold portion, a second end of each first heat-transfer tube being in fluid communication with the second manifold portion, each first heat-transfer tube having an outer surface and an inner surface defining a first conduit; and
one or more spacers disposed along the array of first heat-transfer tubes between the first and second manifold portions, each spacer having a plurality of openings therein, each first heat-transfer tube passing through a corresponding one of the openings in each spacer,
wherein, for each first heat-transfer tube in a cross-sectional view perpendicular to the first direction, the outer surface forms a first shape and the inner surface forms a second shape, and
both the first shape and the second shape lack reflectional symmetry with respect to all lines in the cross-sectional view.

14. The heat exchanger of claim 13, wherein at least one of the first shape and the second shape comprises a non-uniform rational B-spline (NURBS).

15. The heat exchanger of claim 13, wherein:
the first manifold portion is constructed as an inlet for supplying a gas or fluid to the array of first heat-transfer tubes,
the second manifold portion is constructed as an outlet from the array of first heat-transfer tubes,
the array of first heat-transfer tubes is constructed to allow a gas or fluid to flow through the array in thermal contact with the outer surfaces of the first heat-transfer tubes, and
the heat exchanger is configured as a cross-flow heat exchanger.

16. The heat exchanger of claim 13, further comprising:
a second array of substantially-parallel second heat-transfer tubes extending along the first direction between the first and second manifold portions, a first end of each second heat-transfer tube being in fluid communication with the first manifold portion, a second end of each second heat-transfer tube being in fluid communication with the second manifold portion, each second heat-transfer tube having an outer surface and an inner surface defining a third conduit,
wherein, for each second heat-transfer tube in a cross-sectional view perpendicular to the first direction, the outer surface and the inner surface form respective shapes, and
the shape of the outer surface, the shape of the inner surface, a size of each heat-transfer tube, an arrangement of heat-transfer tubes, a pitch between heat-transfer tubes, or any combination thereof for the second array is different than that for the first array.

17. The heat exchanger of claim 13, wherein each of the first heat-transfer tubes has only one conduit therein.

* * * * *